United States Patent
Mohammed et al.

(10) Patent No.: US 9,813,138 B1
(45) Date of Patent: Nov. 7, 2017

(54) ENHANCED MULTIPLE INPUT, MULTIPLE OUTPUT DETECTION IN WIRELESS LOCAL AREA NETWORKS

(71) Applicant: QUALCOMM Incorporated, San Diego, CA (US)

(72) Inventors: Ahmad Abdulrahman Mohammed, Santa Clara, CA (US); Louay Jalloul, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/448,886

(22) Filed: Mar. 3, 2017

(51) Int. Cl.
*H04L 27/06* (2006.01)
*H04B 7/08* (2006.01)
*H04L 27/26* (2006.01)
*H04L 25/03* (2006.01)

(52) U.S. Cl.
CPC ......... *H04B 7/08* (2013.01); *H04L 25/03178* (2013.01); *H04L 27/2649* (2013.01)

(58) Field of Classification Search
CPC .. H04B 7/08; H04L 27/2649; H04L 25/03178
See application file for complete search history.

(56) References Cited

U.S. PATENT DOCUMENTS

| | | | | |
|---|---|---|---|---|
| 7,738,579 B2* | 6/2010 | Sadowsky | ............ | H04B 7/0408 375/260 |
| 2003/0174767 A1* | 9/2003 | Fujii | ............... | H04B 7/005 375/229 |
| 2009/0213955 A1* | 8/2009 | Higuchi | ............... | H04B 7/0669 375/267 |
| 2010/0111232 A1* | 5/2010 | Papadopoulos | ..... | H04L 27/2647 375/340 |

* cited by examiner

*Primary Examiner* — Dac Ha
(74) *Attorney, Agent, or Firm* — Holland & Hart LLP

(57) ABSTRACT

Methods, systems, and devices for wireless communication are described. A wireless communication device may receive multiple data streams from one or more users, associate the multiple data streams with different user groups, and identify modulation symbols for the users after reducing signal contribution from modulation symbols associated with different user groups. For example, the device may receive a signal including multiple spatial streams, partition the data streams into different user groups, and determine a set of sequences from channel characteristics associated with the respective user groups. The wireless communication device may then apply the sequences to the received signal and to values associated with the channel characteristics. Subsets of values may be selected following the application of the sequences, and from the subsets of values, the wireless communication device may identify the sets of modulation symbols associated with one or more of the user groups.

20 Claims, 12 Drawing Sheets

ENHANCED MULTIPLE INPUT, MULTIPLE OUTPUT DETECTION IN WIRELESS LOCAL AREA NETWORKS

BACKGROUND

The following relates generally to wireless communication at a first wireless communication device, and more specifically to enhanced multiple input, multiple output (MIMO) detection in wireless local area networks.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an access point (AP) that may communicate with one or more stations or mobile devices. The AP may be coupled to a network, such as the Internet, and may enable a mobile device to communicate via the network (or communicate with other devices coupled to the access point). A wireless communication device may communicate with a network device bi-directionally. For example, in a WLAN, a station may communicate with an associated AP via DL and UL. The DL (or forward link) may refer to the communication link from the AP to the station, and the UL (or reverse link) may refer to the communication link from the station to the AP.

Some wireless communication devices may communicate with other wireless communication devices using one or more antenna subarrays for communication of signals between a transmitter and receiver (e.g., MIMO communications). For example, a transmission from a single user using multiple spatial streams may be called single user MIMO (SU-MIMO), while a transmission from multiple users may be referred to as multi-user MIMO (MU-MIMO). In such cases, a device configured for MIMO may receive a signal using a plurality of antennas, and the signal may include multiple data streams from one or more transmitting wireless communication devices. Because the signal may include a superposition of modulation symbols for each data stream, processing the signal to separate and retrieve the individual symbols may be complex and power intensive.

SUMMARY

The described techniques relate to improved methods, systems, devices, or apparatuses that support enhanced multiple-input multiple-output (MIMO) detection. A wireless communication device may receive multiple data streams from one or more users and associate the multiple data streams with different user groups. The device may then identify the modulation symbols for the one or more users after reducing signal contribution associated with different user groups. For example, the device may receive a signal including multiple spatial streams, partition the data streams into different user groups, and determine a set of sequences (e.g., rotation sequences) from channel characteristics associated with the respective user groups. The wireless communication device may then apply the sequences to the received signal and to values associated with the channel characteristics. Subsets of values may be selected following the application of the sequences, and from these subsets of values, the wireless communication device may identify the sets of modulation symbols associated with the respective user groups. The enhanced MIMO detection may, for example, employ low-complexity Givens rotations-based null-projection to remove signal contribution from some user groups and more easily determine signals from other user groups.

A method of wireless communication at a first wireless device is described. The method may include receiving a plurality of data streams from a second wireless communication device via a communication channel between the first wireless communication device and the second wireless communication device, identifying, from a first set of data streams of the plurality of data streams, a first set of modulation symbols based at least in part on a plurality of characteristics of the communication channel, where the first set of modulation symbols includes first data for the first wireless communication device, identifying, from a second set of data streams of the plurality of data streams, a second set of modulation symbols based at least in part on the plurality of characteristics of the communication channel, where the second set of modulation symbols includes second data for the first wireless communication device, and demodulating the first set of modulation symbols and the second set of modulation symbols to obtain the first data and the second data.

An apparatus for wireless communication at a first wireless device is described. The apparatus may include means for receiving a plurality of data streams from a second wireless communication device via a communication channel between the first wireless communication device and the second wireless communication device, means for identifying, from a first set of data streams of the plurality of data streams, a first set of modulation symbols based at least in part on a plurality of characteristics of the communication channel, where the first set of modulation symbols includes first data for the first wireless communication device, means for identifying, from a second set of data streams of the plurality of data streams, a second set of modulation symbols based at least in part on the plurality of characteristics of the communication channel, where the second set of modulation symbols includes second data for the first wireless communication device, and means for demodulating the first set of modulation symbols and the second set of modulation symbols to obtain the first data and the second data.

Another apparatus for wireless communication at a first wireless device is described. The apparatus may include a processor, memory in electronic communication with the processor, and instructions stored in the memory. The instructions may be operable to cause the processor to receive a plurality of data streams from a second wireless communication device via a communication channel between the first wireless communication device and the second wireless communication device, identify, from a first set of data streams of the plurality of data streams, a first set of modulation symbols based at least in part on a plurality of characteristics of the communication channel, where the first set of modulation symbols includes first data for the first wireless communication device, identify, from a second set of data streams of the plurality of data streams, a second set of modulation symbols based at least in part on the plurality of characteristics of the communication channel, where the second set of modulation symbols includes second data for the first wireless communication device, and demodulate the first set of modulation symbols and the second set of modulation symbols to obtain the first data and the second data.

In some examples of the method and apparatus described above, identifying the second set of modulation symbols based at least in part on the plurality of characteristics of the communication channel includes: determining, based at least in part on a first characteristic of the communication channel, a first sequence associated with the first set of modulation symbols. Some examples of the method and apparatus described above may further include processes, features, means, or instructions for applying the first sequence to the plurality of data streams and a set of values that may be based at least in part on a second characteristic of the communication channel. Some examples of the method and apparatus described above may further include processes, features, means, or instructions for identifying the second set of modulation symbols from the plurality of data streams based at least in part on application of the first sequence.

Some examples of the method and apparatus described above may further include processes, features, means, or instructions for selecting a first subset of values and a second subset of values from the plurality of data streams after application of the first sequence. Some examples of the method and apparatus described above may further include processes, features, means, or instructions for identifying the second set of modulation symbols based at least in part on a comparison of the first subset of values and the second subset of values.

In some examples of the method and apparatus described above, identifying the first set of modulation symbols based at least in part on the plurality of characteristics of the communication channel includes: determining, based at least in part on the second characteristic of the communication channel, a second sequence associated with the second set of modulation symbols. Some examples of the method and apparatus described above may further include processes, features, means, or instructions for applying the second sequence to the plurality of data streams and a set of values that may be based at least in part on the first characteristic of the communication channel. Some examples of the method and apparatus described above may further include processes, features, means, or instructions for identifying the first set of modulation symbols from the plurality of data streams based at least in part on application of the second sequence.

Some examples of the method and apparatus described above may further include processes, features, means, or instructions for selecting a third subset of values and a fourth subset of values from the plurality of data streams after application of the second sequence. Some examples of the method and apparatus described above may further include processes, features, means, or instructions for identifying the first set of modulation symbols based at least in part on a comparison of the third subset of values and the fourth subset of values.

In some examples of the method and apparatus described above, the first sequence may be determined based at least in part on a first QR decomposition and the second sequence may be determined based at least in part on a second QR decomposition.

In some examples of the method and apparatus described above, the plurality of data streams includes a spatially multiplexed, MIMO data stream. In some examples of the method and apparatus described above, the plurality of data streams includes an eight-by-one dimensional (8×1) MIMO data stream. In some examples of the method and apparatus described above, the first wireless communication device includes a member of a first user group and the second wireless communication device includes a member of a second user group.

Some examples of the method and apparatus described above may further include processes, features, means, or instructions for receiving a plurality of pilot signals from the second wireless communication device. Some examples of the method and apparatus described above may further include processes, features, means, or instructions for determining the plurality of characteristics of the communication channel based at least in part on the plurality of pilot signals.

DETAILED DESCRIPTION

Figure 1:
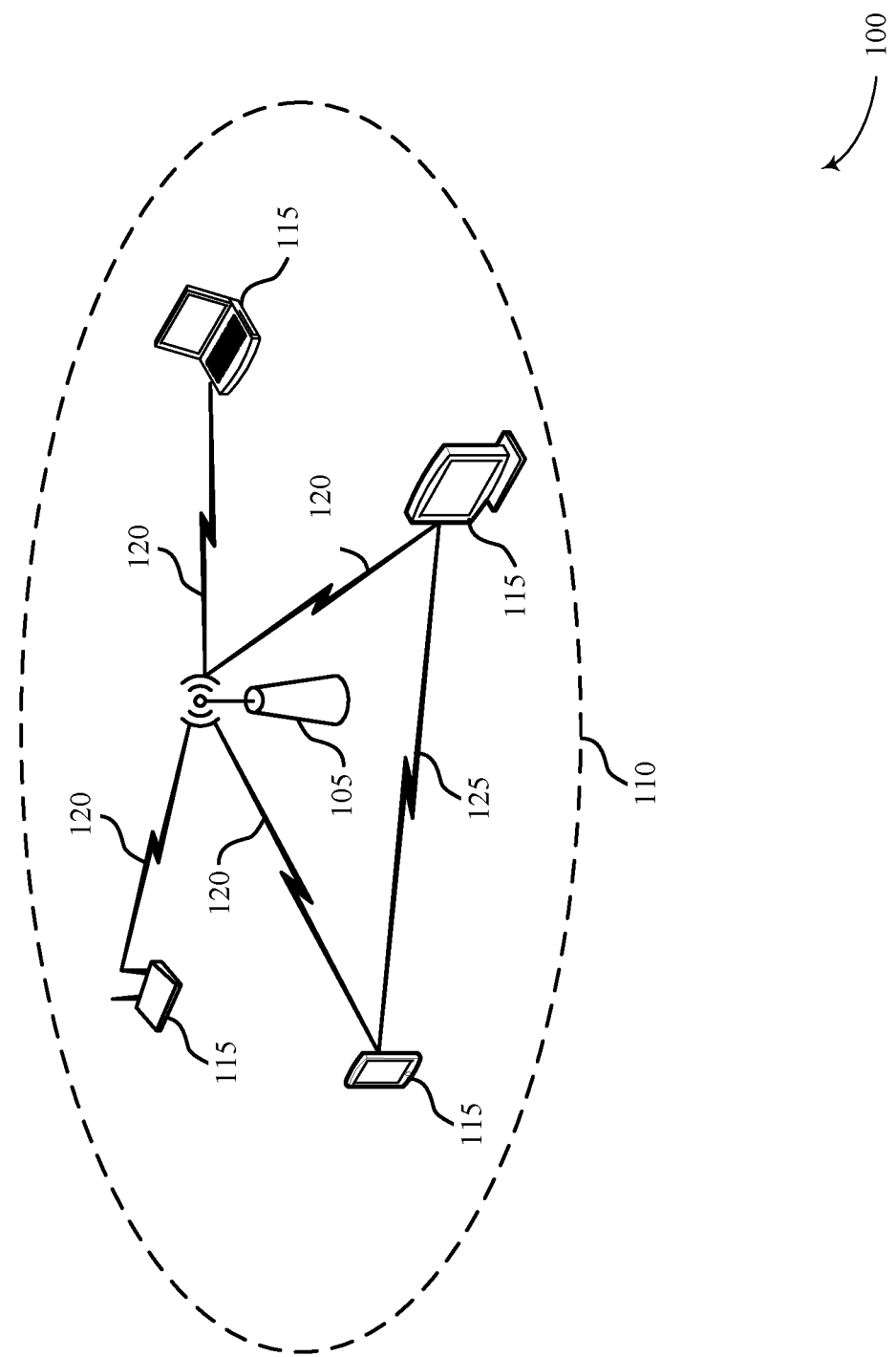
FIG. 1 illustrates an example of a system for wireless communication at a first wireless communication device that supports enhanced multiple input, multiple output (MIMO) detection in accordance with aspects of the present disclosure.

A wireless communication device may receive multiple data streams from one or more transmitting devices and associate sets of the data streams with different user groups. The wireless communication device may identify modulation symbols for one or more user groups by reducing signal contribution associated other user groups. The wireless communication device may employ enhanced MIMO detection methods, such as a low-complexity Givens rotation-based null-projection, to identify the sets of modulation symbols associated with the respective user groups. This may allow for MIMO detection with less computational complexity or power intensity than other MIMO detection schemes.

By way of example, a MIMO signal may include a superposition of spatially multiplexed data streams from one or more transmitting devices. A receiving device operating without the enhanced MIMO detection techniques described herein may perform several QR decompositions (e.g., on a MIMO channel matrix) to retrieve each data stream from the MIMO signal. As used herein, QR decomposition may refer to a decomposition of a matrix into product of a unitary matrix Q and an upper triangular matrix R. QR decompositions may be computationally intensive, and a device capable of MIMO communication may use extensive processing power to retrieve data of each user group. However, for a receiving device operating with the enhanced MIMO detection techniques described herein, a rotation sequence may be applied to reduce signal contribution of a first user group such that the device may more easily detect a data stream of a second user group, and vice versa. So the techniques described herein may result in reduced complexity for a receiving device in detecting modulation symbols associated with one or more transmitting devices.

For example, and as discussed in further detail below, the device may receive a signal y, the signal including a superposition of spatial streams from one or more transmitting devices and modeled by the equation $$y=Hx+n \quad (1)$$

where H is a matrix representing a channel over which the signal was transmitted, x is a modulated data stream vector, and n models additive noise.

The device may divide the streams into two user groups such that the incoming signal can be modeled by the equation $$y=H_1x_1+H_2x_2+n \quad (2)$$

where, for example, y is a vector representing the incoming signal, $H_1$ and $H_2$ are channel matrices obtained by dividing the original channel matrix H into two parts, vectors $x_1$ and $x_2$ are partitioned vectors obtained from the original modulated data stream x and denote the two user groups. The device may perform a QR decomposition on the channel characteristic matrix of the second user group to determine a rotation sequence (e.g., based on Q of the QR decomposition of $H_2$). Applying the rotation sequence to the incoming signal (y) and another channel characteristic matrix ($H_1$) may reduce transmission contribution of the second user group, which may assist detection of symbols of the first user group. The device may apply (e.g., by multiplication) the rotation sequence to the columns of the first user group's channel characteristic matrix, resulting in another matrix, and to the vector representing the incoming signal, resulting in another vector. The device may then analyze the resulting vector and matrix in a MIMO detector, such as a near-maximum-likelihood (near-ML) MIMO detection engine to determine the modulation symbols in $x_1$.

In other examples, the device may use null projection to reduce signal contribution of a first user group and detect symbols for a second user group, then the device may use a whitening matrix to determine symbols for the first user group. For example, to detect symbols for the second user group, the device may use a null projection $P_2$ to remove signal contribution of the first user group (e.g., $P_2H_1=0$, thus $P_2y=P_2H_2x_2+n$). The device may apply $P_2$ to the received signal and the channel characteristic matrix of the second user group and submit the resulting matrix and vector to the near-ML MIMO detection engine.

The device may then determine a set of log-likelihood ratios (LLRs) corresponding to the modulation symbols in $x_2$ and determine the modulation symbols based on the LLRs. After detecting the modulation symbols in $x_2$, the device may determine the modulation symbols of the first user group by applying a whitening matrix W to whiten noise and residual interference. By using the whitening matrix, the device may perform fewer QR decompositions, and may refrain from using a combining matrix, or performing significant squaring of matrices, which may result in reduced complexity and decibel improvement.

Aspects of the disclosure introduced above are described below in the context of a wireless communications system. Exemplary diagrams illustrating computational aspects structure supporting enhanced MIMO detection are then described. Aspects of the disclosure are further illustrated by and described with reference to apparatus diagrams, system diagrams, and flowcharts that relate to low-complexity Givens rotations-based null-projection MIMO detection.

FIG. 1 illustrates a wireless local area network (WLAN) 100 (also known as a Wi-Fi network) configured in accordance with various aspects of the present disclosure. The WLAN 100 may include an access point (AP) 105 and multiple associated stations 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various stations 115 in the network are able to communicate with one another through the AP 105. APs 105 or stations 115, or both, may be configured for enhanced MIMO detection. For instance, APs 105 and stations 115 may employ a low-complexity Givens rotation-based null-projection techniques described herein.

Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS. WLAN 100 may support low-complexity Givens rotations-based null-projection MIMO detection.

Although not shown in FIG. 1, a station 115 may be located in the intersection of more than one coverage area 110 and may associate with more than one AP 105. A single AP 105 and an associated set of stations 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two stations 115 may also communicate directly via a direct wireless link 125 regardless of whether both stations 115 are in the same coverage area 110. Examples of direct wireless links 120 may include Wi-Fi Direct connections, Wi-Fi Tunneled Direct Link Setup (TDLS) links, and other group connections. Stations 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a station 115 (or an AP 105) may be detectable by a central AP 105, but not by other stations 115 in the coverage area 110 of the central AP 105. For example, one station 115 may be at one end of the coverage area 110 of the central AP 105 while another station 115 may be at the other end. Thus, both stations 115 may communicate with the AP 105, but may not receive the transmissions of the other. This may result in colliding transmissions for the two stations 115 in a contention based environment (e.g., carrier sense multiple access (CSMA) or collision avoidance (CA)) because the stations 115 may not refrain from transmitting on top of each other. A station 115 whose transmissions are not identifiable, but that is within the same coverage area 110 may be known as a hidden node. CSMA/CA may be supplemented by the exchange of a request-to-send (RTS) packet transmitted by a sending station 115 (or AP 105) and a clear-to-send (CTS) packet transmitted by the receiving station 115 (or AP 105). This may alert other devices within range of the sender and receiver not to transmit for the duration of the primary transmission. Thus, RTS/CTS may help mitigate a hidden node problem.

A station 115 may be configured to collaboratively communicate with multiple, other wireless communication devices such as APs 105 and other stations 115 through, for example, MIMO, Coordinated Multi-Point (CoMP), or other schemes. MIMO techniques use multiple antennas on the base stations or multiple antennas on the station 115 to take advantage of multipath environments to transmit multiple data streams. A transmission from a single user using multiple spatial streams may be called single user MIMO (SU-MIMO), while a transmission from multiple users may be referred to as multi-user MIMO (MU-MIMO). CoMP includes techniques for dynamic coordination of transmission and reception by a number of APs to improve overall transmission quality for stations 115 as well as increasing network and spectrum utilization.

Modulation is the process of representing a digital signal by modifying the properties of a periodic waveform (e.g., frequency, amplitude and phase). Demodulation takes a modified waveform and generates a digital signal. A modulated waveform may be divided into time units known as symbols. Each symbol may be modulated separately. In a wireless communication system that uses narrow frequency subcarriers to transmit distinct symbols, the modulation is accomplished by varying the phase and amplitude of each symbol. For example, a binary phase-shift keying (BPSK) modulation scheme conveys information by alternating between waveforms that are transmitted with no phase offset or with a 180° offset (i.e., each symbol conveys a single bit of information). In a quadrature amplitude modulation (QAM) scheme, two carrier signals (known as the in-phase component, I, and the quadrature component, Q) may be transmitted with a phase offset of 90°, and each signal may be transmitted with specific amplitude selected from a finite set. The number of amplitude bins determines the number of bits that are conveyed by each symbol. For example, in a 16 QAM scheme, each carrier signal may have one of four amplitudes (e.g., −3, −1, 1, 3), which results in 16 possible combinations (i.e., 4 bits). The various possible combinations may be represented in a graph known as a constellation map, where the amplitude of the I component is represented on the horizontal axis and the Q component is represented on the vertical axis.

A Givens rotation may be used to zero an index of a two-dimensional matrix, A, by rotating the matrix in a plane spanned by two coordinate axes. A wireless communication device may use Givens rotations to produce an upper triangular matrix (e.g., R) and a rotation matrix or sequence (e.g., Q) for a QR decomposition. Q may be used to null values of A, but other matrices or vectors (e.g., such as noise) may preserve their values under the same application. Thus Givens rotations-based null projection may refer to using a rotation sequence determined from a number of Givens rotations on a matrix such that, after applying the rotation sequence, values for some matrices are preserved and values of other matrices are nulled or canceled.

In WLAN 100, a wireless communication device, such as an AP 105 or a station 115, may receive multiple data streams from one or more users and associate the multiple data streams with different user groups. The wireless communication device may then identify the modulation symbols for the one or more users after reducing signal contributions associated with different user groups. For example, the wireless communication device may receive a signal including multiple spatial streams, partition the data streams into different user groups, and determine a set of sequences (e.g., rotation sequences) from channel characteristics associated with the respective user groups. The wireless communication device may then apply the sequences to the received signal and to values associated with the channel characteristics. Subsets of values may be selected following the application of the sequences, and from these subsets of values, the wireless communication device may identify the sets of modulation symbols associated with the respective user groups.

Figure 2:
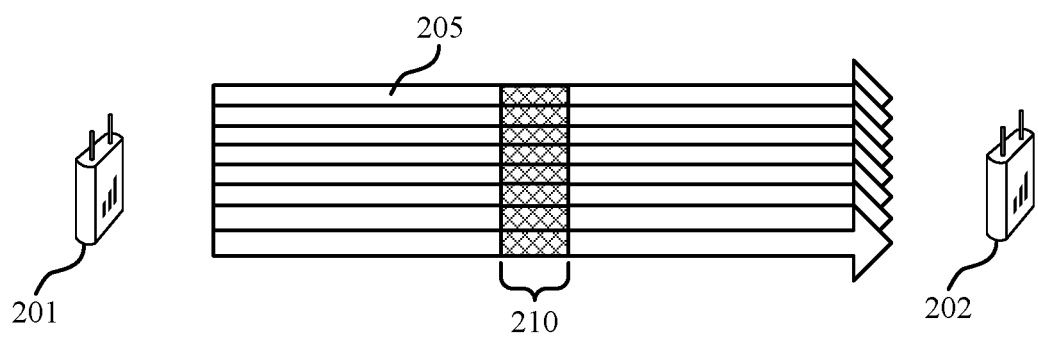
FIG. 2 illustrates an example of a wireless communications system that supports enhanced MIMO detection in accordance with aspects of the present disclosure.

FIG. 2 illustrates an example of a wireless communications system 200 for low-complexity Givens rotations-based null-projection MIMO detection. Wireless communications system 200 includes multiple wireless communication devices 201, which may be examples of an AP 105 or a station 115 as described with reference to FIG. 1. For example, both a first wireless communication device 201 and second wireless communication device 202 may be APs 105 communicating with each other using MIMO transmissions over a communication channel. In such cases, first wireless communication device 201 may receive a signal including a set of incoming data streams 205 that include a set of modulation symbols 210 transmitted by second wireless communication device 202 on a set of resources, where the set of resources may overlap in time or frequency, or both. Alternatively, data streams 205 may be transmitted by multiple stations 115 (not shown), where each station 115 may, for example, transmit its own data stream 205 (e.g., eight stations 115 may communicate with a single AP 105, and each station 115 may share the same time and frequency resources). In either case, the first wireless communication device 201 may receive and detect the set of modulation symbols 210 simultaneously, and attempt to demodulate the set of modulation symbols 210 using, for example, Givens rotations-based null-projection MIMO detection. Wireless communications system 200 may be an example of a MIMO detection scheme implementation in wireless communication devices that enables efficient, low-complexity, detection of modulation symbols 210 transmitted on multiple data streams 205.

For example, first wireless communication device 201 may partition or divide the sets of data streams of the incoming data streams 205 between user groups, and the first wireless communication device 201 may determine modulation symbols 210 associated with a certain user group by reducing a signal contribution of other user groups. In such cases, first wireless communication device 201 may receive data streams 205 at an antenna, represented by y, corresponding to a superposition of spatial streams, where the received signal at the antenna is modeled by Equation 1, discussed above. In such examples, y may be a vector representing the received signal at first wireless communication device 201, and the signal may include a superposition of the incoming data streams 205. The first wireless communication device 201 may partition the spatial streams between two user groups. In Equation 2, as applied to the example depicted in FIG. 2, $H_1$ and $H_2$ may be channel matrices modeling characteristics of the channel used to transmit modulation symbols 210 (e.g., channel characteristics between transmit and receive antennas at second wireless communication device 202 and first wireless communication device 201, respectively) and partitioned for respective user groups, vectors $x_1$ and $x_2$ represent partitioned vectors obtained from the data streams 205 and include modulation symbols 210 for respective user groups, and vector n represents an additive noise. In some examples, $x_1$ and $x_2$ may include symbols transmitted from a varying number of devices. For example, if the device has 8 receive antennas, $x_1$ and $x_2$ may each include 4 symbols, but each symbol in $x_1$ may be transmitted from different wireless communication devices while each symbol in $x_2$ may be transmitted by a single, different wireless communication device. The number of receive antennas, user groups, and devices in each user group may be different or configurable.

In some examples, first wireless communication device 201, may determine modulation symbols 210 for a first user group ($x_1$) based on a rotation sequence of the channel characteristics associated with a second user group (e.g., channel characteristic matrix, $H_2$). First wireless communication device 201 may perform a QR decomposition on the channel characteristic matrix of the second user group to determine the rotation sequence (e.g., based on Q of the QR decomposition of $H_2$). Applying the rotation sequence to the received signal and another channel characteristic matrix (e.g., channel characteristic matrix, $H_1$) may reduce a transmission contribution of the second user group, which may enable detection of modulation symbols 210 for the first user group.

First wireless communication device 201 may apply (e.g., by multiplication) the rotation sequence to the columns of the first user group's channel characteristic matrix, resulting in another matrix, and to the vector representing the incoming signal, resulting in another vector. First wireless communication device 201 may then use the resulting vector and matrix in a MIMO detector (e.g., a near-maximum-likelihood (near-ML) MIMO detection engine) to determine the modulation symbols 210 in $x_1$. In some cases, first wireless communication device 201 may use a lower section of entries from the resulting matrix and vector in the near-ML MIMO detection engine to determine the set of modulation symbols 210 associated with the first user group. Thus, first wireless communication device 201 may reduce a total number of QR decompositions used to obtain the set of modulation symbols 210 by applying a rotation sequence from an already performed QR decomposition.

As described above, the rotation sequence for a user group may be determined based on a QR decomposition of the channel characteristic matrix for the respective user group. Accordingly, the channel characteristic matrix for the first user group may be expressed as $H_1 = Q_1 R_1$ after the QR decomposition. $Q_1 R_1$ may be further expanded into $$[Q_{1a} \quad Q_{1b}] \begin{bmatrix} R_{1a} \\ 0 \end{bmatrix},$$

where $Q_{1a}$ represents an $N_{rx} \times N_1$ matrix and $Q_{1b}$ represents an $N_{rx} \times (N_{rx}-N_1)$ matrix, where $N_{rx}$ is a total number of MIMO receive antennas of first wireless communication device 201, and $N_1$ is the number of columns in $H_1$. Because $Q_1^H Q_1 = I_{N_{rx}}$ (e.g., where $Q_1^H$ is a Hermitian transpose or conjugate transpose of $Q_1$), it can be observed that $Q_{1b}^H H_1 = 0$, since $Q_{1b}^H Q_{1a} = 0$, and it can further be observed that $Q_{1b}^H Q_{1b} = I_{(N_{rx}-N_1)}$. Based on these observations, $Q_{1b}^H$ may satisfy conditions for a projection matrix which may null $H_1$ and preserve noise whiteness. Applying the rotation sequence obtained from a QR decomposition of $H_1$ thus corresponds to multiplying by $Q_1^H$. Since $$Q_1^H = \begin{bmatrix} Q_{1a}^H \\ Q_{1b}^H \end{bmatrix},$$

the lower $(N_{rx}-N_1)$ entries of the rotation output may correspond to multiplying by $Q_{1b}^H$. In some examples, the wireless communication device may construct matrices $H_1$ and $H_2$ such that the matrices have common columns.

By applying the rotation sequence to the received signal and using the lower entries of the resulting vector, first wireless communication device 201 may cancel signal contribution of another user group. For example, to remove signal contribution of the first user group, first wireless communication device 201 may apply the rotation sequence of the first user group to the received signal y and take the lower entries of the output (e.g., multiply by $Q_{1b}^H$) as follows $$Q_{1b}^H y = Q_{1b}^H H_1 x_1 + Q_{1b}^H H_2 x_2 + Q_{1b}^H n \qquad (3)$$

which may be simplified to $$Q_{1b}^H y = Q_{1b}^H H_2 x_2 + Q_{1b}^H n \qquad (4)$$

where there may be no contribution from $x_1$ because $Q_{1b}^H H_1 = 0$. After applying the rotation sequence to the received signal and channel characteristic matrices, the lower entries from resulting matrices and vectors may be used in a MIMO detector to determine modulation symbols 210 of one user group without signal contribution of the other user group. Applying the rotation sequence to the received signal and the channel matrices may reduce a number of QR decompositions and rotation sequence applications, which may reduce complexity by avoiding unnecessary operations and may lead to area reduction and increased precision at first wireless communication device 201.

In some examples, first wireless communication device 201 may determine $x_1$ based on the rotation sequence corresponding to $H_2$. For instance, first wireless communication device 201 may determine the rotation sequence by performing the QR decomposition on $H_2$ (e.g., the channel characteristics corresponding to a channel used by the second user group, $x_2$), and first wireless communication device 201 may then apply the rotation sequence to the columns of $H_1$. First wireless communication device 201 may keep the lower $N_{rx}-N_2$ entries of each of the rotated $N_1$ columns of $H_1$ to yield a $(N_{rx}-N_2) \times N_1$ matrix, where $N_2$ is the number of columns in $H_2$. First wireless communication device 201 may then enter the $(N_{rx}-N_2) \times N_1$ matrix into a MIMO detector.

First wireless communication device 201 may also apply the rotation sequence corresponding to $H_2$ to y and keep the lower $N_{rx}-N_2$ entries of the rotated vector, which may remove signal contributions of the second user group. In some examples, the wireless communication device may determine $H_2$ from channel estimation based on the received signal and previously received pilot signals. Applying the rotation sequence to y may yield a $(N_{rx}-N_2) \times 1$ vector, and first wireless communication device 201 may use the $(N_{rx}-N_2) \times 1$ vector in conjunction with the $(N_{rx}-N_2) \times N_1$ matrix in the MIMO detector to detect the set of symbols in the vector $x_1$. Thus, first wireless communication device 201 may determine the modulation symbols 210 in the vector $x_1$ by using a known matrix (e.g., lower entries of $H_1$ with the applied rotation sequence) and a known input signal (e.g., lower entries of y with the applied rotation sequence to remove contribution from $x_2$). First wireless communication device 201 may determine the modulation symbols 210 in $x_1$ based on the corresponding LLRs received from the MIMO detector.

Similarly, first wireless communication device 201 may determine $x_2$ based on a rotation sequence corresponding to $H_1$. For example, first wireless communication device 201 may determine the rotation sequence corresponding to $H_1$ (e.g., the channel corresponding to the other user group, $x_1$) and apply the rotation sequences to the columns of $H_2$. First wireless communication device 201 may keep the lower $N_{rx}-N_1$ entries of each of the rotated $N_2$ columns of $H_2$ to yield a $(N_{rx}-N_1) \times N_2$ matrix. First wireless communication device 201 may then enter the $(N_{rx}-N_1) \times N_2$ matrix in the MIMO detector. First wireless communication device 201 may apply the rotation sequence corresponding to $H_1$ to y and keep the lower $N_{rx}-N_1$ entries of the rotated vector, which may remove signal contributions of the first user group. Applying the rotation sequence to y may again yield a $(N_{rx}-N_1) \times 1$ vector. First wireless communication device 201 may use the $(N_{rx}-N_1) \times 1$ vector in conjunction with the $(N_{rx}-N_1) \times N_2$ matrix in the MIMO detector to detect the set of modulation symbols 210 in the vector $x_2$. In such cases, first wireless communication device 201 may determine the modulation symbols 210 in $x_2$ based on the corresponding LLRs received from the MIMO detector.

In other cases, first wireless communication device 201 may use null projection to reduce signal contribution of a first user group and detect modulation symbols 210 for a second user group, and first wireless communication device 201 may use a whitening matrix to determine modulation symbols 210 for the first user group. For example, to detect modulation symbols 210 for the second user group, first wireless communication device 201 may use a null projection $P_2$ to remove signal contribution of the first user group (e.g., $P_2H_1=0$, thus $P_2y=P_2H_2x_2+n$). First wireless communication device 201 may apply $P_2$ to the received signal and the channel characteristic matrix of the second user group and submit the resulting matrix and vector to a MIMO detector. First wireless communication device 201 may then determine a set of LLRs corresponding to the modulation symbols 210 in $x_2$, where the modulation symbols 210 may be determined based on LLRs. After detecting the modulation symbols 210 in $x_2$, first wireless communication device 201 may determine the modulation symbols 210 of the first user group by applying a whitening matrix W to whiten noise and residual interference. By using the whitening matrix, first wireless communication device 201 may not perform as many QR decompositions, use a combining matrix, or perform significant squaring of matrices, which may result in reduced complexity and decibel improvement.

The whitening matrix, and certain equations used to determine the modulation symbols 210 of $x_1$, may be based on the LLRs or modulation symbols 210 of $x_2$. For example, W, and equations used to determine the modulation symbols 210 of $x_1$, may be based on the equations $$W = \left(\frac{H_2 C_{x_2} H_2^H}{\sigma^2} + 1\right)^{-\frac{1}{2}} \tag{5}$$

$$C_{x_2} = \text{diag}([\text{var}(x_2,1) \ldots \text{var}(x_{2,N_2})]). \tag{6}$$

$$\text{var}(x_{2,i}) = E(|x_{2,i}|^2 - |E(x_{2,i})|^2 = \sum_{k=1}^{M} P_{i,k}|X_k|^2 - |E(x_{2,i})|^2. \tag{7}$$

$$E(x_2) = [E(x_{2,i}) \ldots E(x_{2,N_2})]^T. \tag{8}$$

$$E(x_{2,i}) = \sum_{k=1}^{M} P_{i,k}|X_k|^2. \tag{9}$$

$$P_{i,k} = \text{Prob}(x_{2,i} = X_k) = f(\text{LLRs of } x_{2,i}) \tag{10}$$

where M is the constellation size and $X_k$ are the constellation symbols. In some examples, constellation symmetry may be used to determine $E(x_{2,i})$ and $\text{var}(x_{2,i})$ as direct functions of LLRs, such as by the equations $$E(x_{2,i}) = \alpha S_{2,i}. \tag{11}$$

$$\text{var}(x_{2,i}) = 1 - \alpha^2, \forall i. \tag{12}$$

where $S_{2,i}$ is a hard-decision QAM symbol (e.g., QAM solution output of the MIMO detector), and $0 \le \alpha \le 1$. In some examples, $\alpha=0$, and pre-whitening on the first user group may not cause cancellation, and two MIMO detectors may be able to work in parallel. If $\alpha=1$, there may be a full cancellation of the first user group with no whitening, which may result in low complexity.

In some cases, first wireless communication device 201 may use the whitening matrix to determine modulation symbols 210 of the first user group. For example, first wireless communication device 201 may determine $E(x_2)$ and $C_{x_2}$ from the MIMO detector used to determine the modulation symbols 210 in $x_2$. The whitening matrix, W, may be computed based on $C_{x_2}$, and $E(x_2)$ may be applied to $H_2$, resulting in $H_2E(x_2)$. $H_2E(x_2)$ may be subsequently subtracted from the received signal, y, followed by the application of the whitening matrix, resulting in a whitening vector $W(y-H_2E(x_2))$. First wireless communication device 201 may apply the whitening vector to the channel characteristic matrix of the first user group and enter $W(y-H_2E(x_2))$ and $WH_1$ into the MIMO detector. First wireless communication device 201 may then use the MIMO detector to determine a set of modulation symbols 210 for $x_1$.

Figure 3:
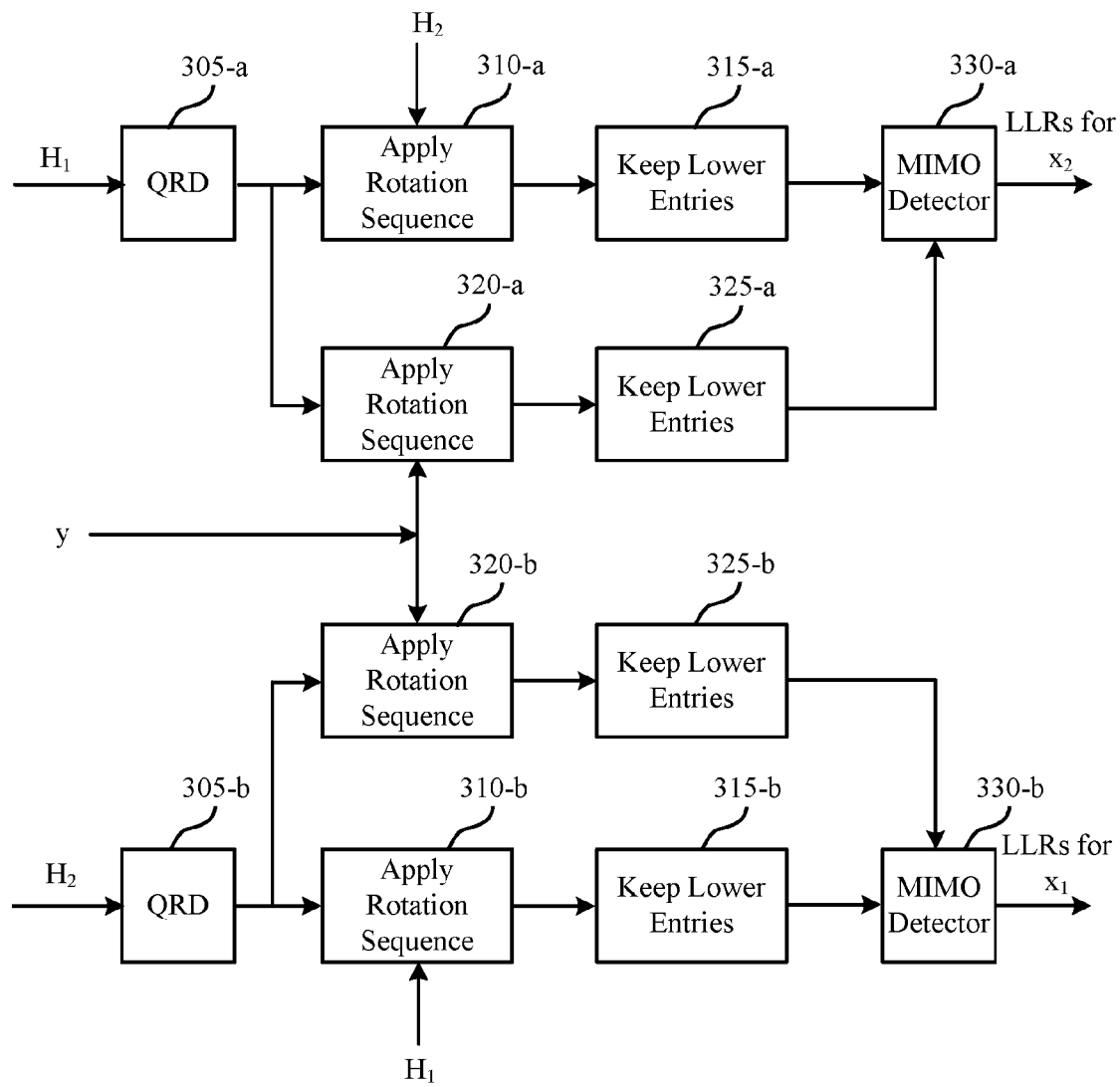
FIG. 3 illustrates an example of rotation based MIMO detection in a system that supports enhanced MIMO detection in accordance with aspects of the present disclosure.

FIG. 3 illustrates an example of rotation based MIMO detection 300 in a system that supports enhanced MIMO detection in accordance with aspects of the present disclosure. A first wireless communication device may be communicating with other wireless communication devices (e.g., stations 115 or APs 105) using MIMO transmissions over a communication channel. The first wireless communication device may receive a signal including a set of data streams, each data stream including modulation symbols transmitted by other wireless communication devices.

The first wireless communication device may receive a signal, y, from a second wireless communication device via a communication channel between the first wireless communication device and the second wireless communication device. In some examples, the signal may include a superposition of data streams from multiple other wireless communication devices. After receiving the signal, the first wireless communication device may partition sets of the data streams into different user groups such that the signal is represented as $y=H_1x_1+H_2x_2+n$, as described with reference to FIG. 2.

At 305-*a*, the first wireless communication device may determine, based on a first characteristic of the communication channel, a first sequence (e.g., a rotation sequence) associated with the first set of modulation symbols. For example, the first wireless communication device may perform a QR decomposition on the channel characteristic matrix for the first user group (e.g., $H_1$) to obtain a first rotation sequence (e.g., $Q_1^H$).

At 310-*a*, first wireless communication device may apply the first sequence to a set of values that are based on a second characteristic of the communication channel. For example, the first wireless communication device may apply (e.g., by multiplication) the first rotation sequence to the channel characteristic matrix for the second user group, resulting in another matrix $Q_1^H H_2$. At 315-*a*, the first wireless communication device may keep the lower entries of $Q_1^H H_2$, or $Q_{1b}^H H_2$.

At 320-*a*, the first wireless communication device may apply the first sequence to the set of data streams. For example, the first wireless communication device may apply the first rotation sequence to the input data stream represented by y, resulting in the vector $Q_1^H y = Q_1^H H_1 x_1 + Q_1^H H_2 x_2 + Q_1^H n$. At 325-*a*, the first wireless communication device may select a first subset of values and a second subset of values from the set of data streams after application of the first sequence. For example, the first wireless communication device may keep the lower entries of the resulting vector, which may be the same as multiplying by $Q_{1b}^H$ instead of $Q_1^H$. $Q_1^H H_1 x_1$ can be rewritten as $Q_1^H Q_1 R_1 x_1$, where $Q_1^H Q_1$ can be simplified as an Identity matrix and $R_1$ is an upper triangular matrix. Thus, taking the lower entries of $Q_1^H y$ may cancel signal contribution of the first user group, and $Q_1^H y = Q_1^H H_2 x_2 + Q_1^H n$. That is, the first wireless communication device may identify, from a first set of data streams of the full set of data streams, a first set of modulation symbols based on a set of characteristics of the communication channel, where the first set of modulation symbols includes first data for the first wireless communication device.

At 330-*a*, the first wireless communication device may identify, from a first set of data streams of the total set of data streams, the first set of modulation symbols based on the set of characteristics of the communication channel, where the first set of modulation symbols includes first data for the first wireless communication device and identify, from a second set of data streams of the total set of data streams, a second set of modulation symbols based on the set of characteristics of the communication channel, where the second set of modulation symbols includes second data for the first wireless communication device. For example, the first wireless communication device may enter the matrix $Q_{1b}^H H_2$ and the vertex $Q_{1b}^H y$ into a MIMO detector to determine a set of LLRs, which can be used to identify the set of modulation symbols for the first user group.

The first wireless communication device may determine the second set of modulation symbols in a similar process described above for the determination of the first set of modulation symbols. For example, at 305-*b*, first wireless communication device may determine, based on the second characteristic of the communication channel, a second sequence associated with the second set of modulation symbols. For instance, the first wireless communication device may perform a QR decomposition on a channel characteristic matrix for the second user group ($H_2$) to obtain a second rotation sequence ($Q_2^H$).

At 310-*b*, the first wireless communication device may apply the second sequence to a set of values that are based on the first characteristic of the communication channel. For example, the first wireless communication device may apply the second rotation sequence to the channel characteristic matrix for the first user group, resulting in a matrix $Q_2^H H_1$. At 315-*b*, the first wireless communication device may keep the lower entries of that matrix, or $Q_{2b}^H H_1$.

At 320-*b*, the first wireless communication device may apply the second sequence to the received signal y. Thus, the resulting vector $Q_2^H y = Q_2^H H_1 x_1 + Q_2^H H_2 x_2 + Q_2^H n$. At 325-*b*, the first wireless communication device may select a third subset of values and a fourth subset of values from the set of data streams after application of the second sequence. For example, the first wireless communication device may keep the lower entries of the resulting vector, which may be the same as multiplying by $Q_{2b}^H$ instead of $Q_2^H$. $Q_2^H H_2 x_2$ can be rewritten as $Q_2^H Q_2 R_2 x_2$, where $Q_2^H Q_2$ can be simplified as an Identity matrix and $R_2$ is an upper triangular matrix. Thus, taking the lower entries of $Q_2^H y$ may cancel signal contribution of the first user group, and $Q_2^H y = Q_2^H H_1 x_1 + Q_2^H n$. The first wireless communication device may identify, from a second set of data streams of the full set of data streams, a second set of modulation symbols based on the set of characteristics of the communication channel, where the second set of modulation symbols includes second data for the first wireless communication device.

At 330-*b*, the first wireless communication device may enter the matrix $Q_{2b}^H H_1$ and the vertex $Q_{2b}^H y$ into a MIMO detector to determine a set of LLRs, which can be used to identify the set of modulation symbols for the second user group. The first wireless communication device may then demodulate the first set of modulation symbols and the second set of modulation symbols to obtain the first data and the second data.

Figure 4:
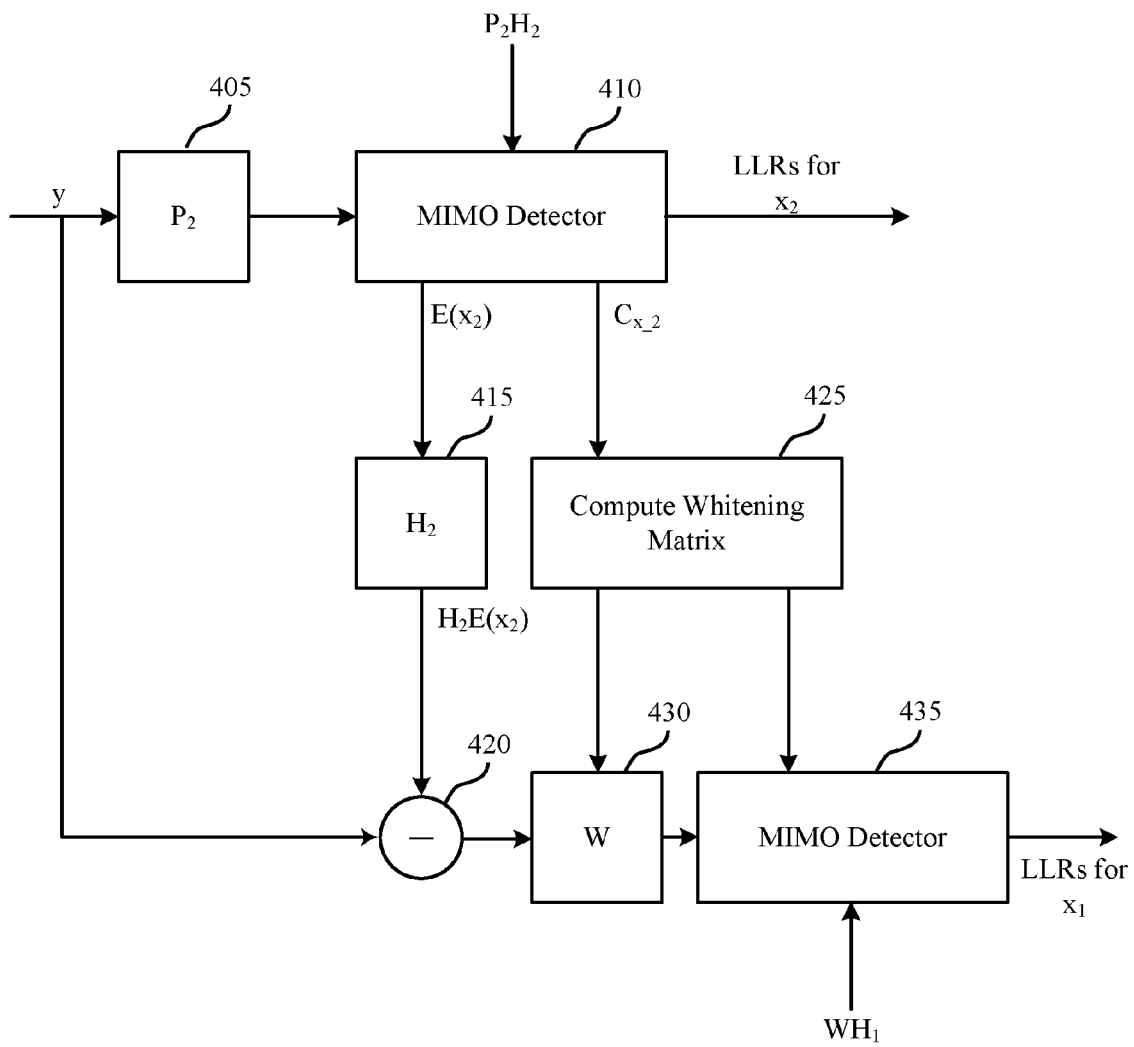
FIG. 4 illustrates an example of a whitening matrix application in a system that supports enhanced MIMO detection in accordance with aspects of the present disclosure.

FIG. 4 illustrates an example of a whitening matrix application 400 in a system that supports enhanced MIMO detection in accordance with aspects of the present disclosure. A wireless communication device may receive a MIMO signal, y, and partition data streams of the MIMO signal into two user groups (denoted by $x_1$ and $x_2$) such that $y = H_1 x_1 + H_2 x_2 + n$, as described with reference to FIG. 2. Whitening matrix application 400 may describe the wireless communication device using a null projection matrix on the received signal to cancel signal contribution of a first user group data stream to retrieve modulation symbols of a second user group, then using a whitening matrix based on the modulation symbols of the second user group to retrieve modulation symbols for the first user group.

At 405, the wireless communication device may apply a null projection matrix, $P_2$, to the received signal y, received at an antenna and containing multiple modulation symbols. The null projection matrix may cancel a transmission contribution of a first user group (e.g., $P_2 H_1 = 0$). The wireless communication device may also apply the projection matrix to $H_2$ and enter the vector $P_2 y = P_2 H_2 x_2$ n into a MIMO detector at 410. The MIMO detector may return LLRs for $x_2$ based on the vector $P_2 y$ and the matrix $P_2 H_2$. The wireless communication device may determine modulation symbols for the second user group based on LLRs returned for the second user group.

In some cases, the wireless communication device may determine a matrix $E(x_2)$ (e.g., as described with reference to FIG. 2) based on the LLRs returned from the MIMO detector. The wireless communication device may also determine a diagonal matrix, $C_{x_2}$ (e.g., as described with reference to FIG. 2), based on the LLRs for the second user group. At 415, The wireless communication device may in turn apply the matrix $E(x_2)$ to the channel characteristic matrix for the second user group, resulting in $H_2E(x_2)$. At 420, the wireless communication device may determine a difference between the received signal y and $H_2E(x_2)$, resulting in a vector $y-H_2E(x_2)$.

At 425, the wireless communication device may use the diagonal matrix $C_{x_2}$ to compute a whitening matrix. For example, the wireless communication device may determine the whitening matrix based on $$W = \left( \frac{H_2 C_{x_2} H_2^H}{\sigma^2} + 1 \right)^{-\frac{1}{2}},$$

as described above. At 430, the wireless communication device may apply the whitening matrix to the vector $y-H_2E(x_2)$ from 420.

In some cases, the wireless communication device may enter the whitened vector and a whitened channel characteristics matrix for the first user group (e.g., $WH_1$) into a MIMO detector at 435. The wireless communication device may then determine LLRs for modulation symbols of the first user group from the MIMO detector, and further determine the modulation symbols of the first user group based on the LLRs. In other examples, the wireless communication device may apply a projection matrix on the channel characteristic matrix of the second user group to determine the modulation symbols of the first user group and apply the whitening matrix to determine modulation symbols of the second user group.

Figure 5A:
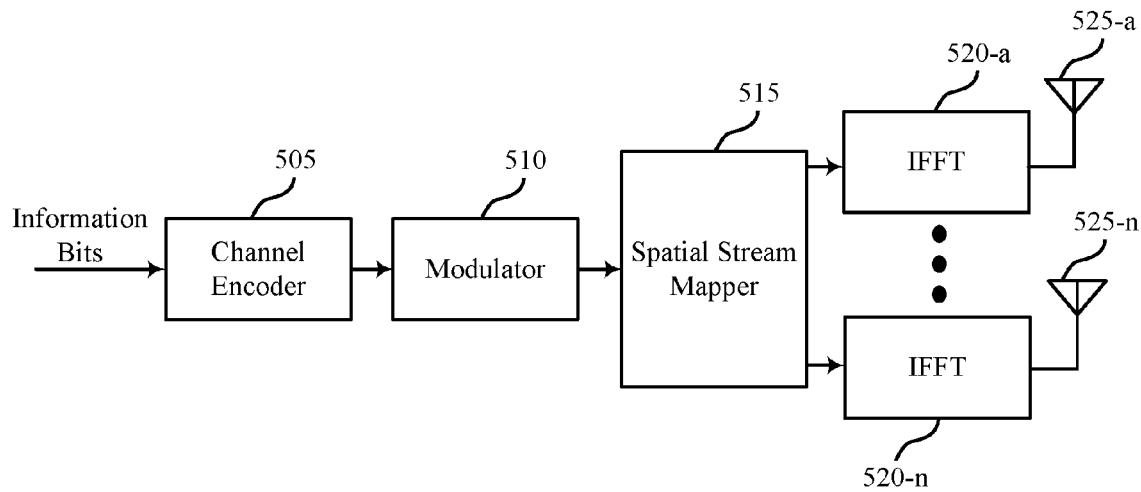
FIGS. 5A-5B illustrate examples of transmit and receive chains in a system that supports enhanced MIMO detection in accordance with aspects of the present disclosure.
Figure 5B:
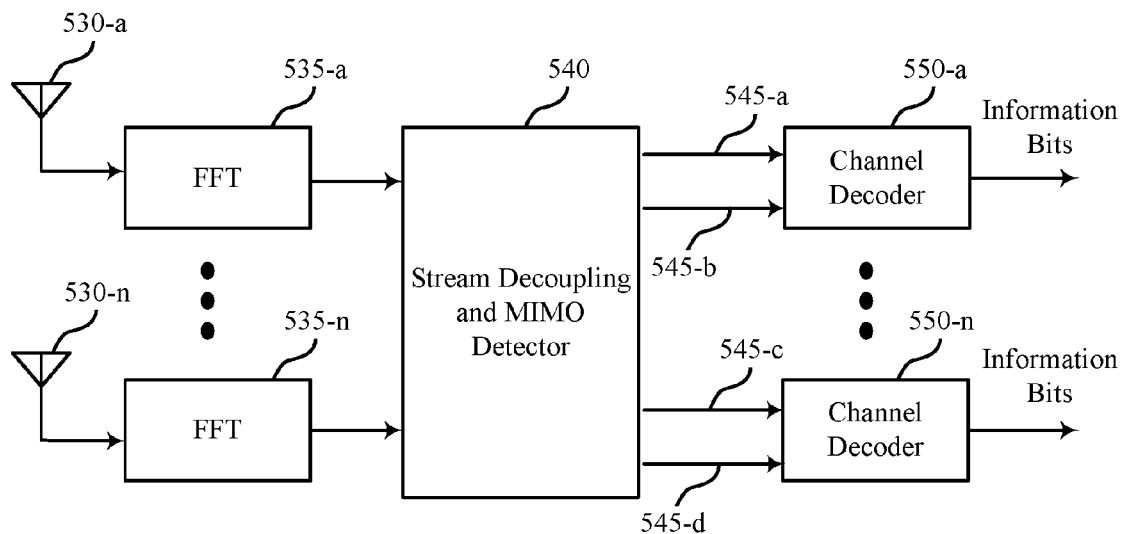

FIGS. 5A and 5B show data stream transmit and receive chains 500 in a system that supports enhanced MIMO detection in accordance with various aspects of the present disclosure. A wireless communication device, such as an AP 105 or a station 115 as described with reference to FIG. 1, may use one or more antennas to transmit one or more spatially multiplexed data streams to another wireless communication device. For example, a first wireless communication device may transmit data using data stream transmit chain 500-a as described in FIG. 5A. A second wireless communication device may receive from the first wireless communication device, or from multiple wireless communication devices, a set of spatially multiplexed data streams using a plurality of antennas. In such cases, the second wireless communication device may receive the data streams using data stream receive chain 500-b as described in FIG. 5B.

As illustrated in FIG. 5A, the first wireless communication device may prepare a spatially multiplexed data stream transmission. The first wireless communication device may determine information bits for transmission and encode the information bits in a channel encoder 505, the channel encoder 505 outputting encoded information bits.

The encoded information bits may be sent to a modulator 510 where the encoded information bits may be modulated, resulting in modulated symbols (e.g., symbols modulated according to a QAM scheme). The multiple symbols may then be mapped to a spatially multiplexed data stream at spatial stream mapper 515. Then, the first wireless communication device may perform a frequency to time domain transform of the signals using an inverse fast Fourier transform (IFFT) on the data streams at IFFT component 520-a. The first wireless communication device may perform an IFFT for each data stream (e.g., using IFFT component 520-a through IFFT component 520-n to perform the IFFT on N data streams).

The first wireless communication device may then transmit the data streams using one or more antennas 525. For example, a first data stream may be transmitted using antenna 525-a, and an Nth data stream may be transmitted using antenna 525-n. The first wireless communication device may transmit the spatially multiplexed data streams to a second wireless communication device. In some cases, multiple transmitting devices may share the same time and frequency resources, where the transmitting devices may have different numbers of transmit antennas and spatial streams. Accordingly, the spatial streams transmitted by the first wireless communication device may share time and frequency resources with transmissions from another wireless communications device.

As illustrated in FIG. 5B, the second wireless communication device may receive a signal using the receive chain 500-b. For example, the second wireless communication device may receive multiple data streams with multiple antennas 530 (e.g., antenna 530-a through antenna 530-n), where the data streams may be spatially multiplexed and received from a transmitting wireless communication device (e.g., the first wireless communication device), or from multiple wireless communications devices. The number of data streams received may be based on a number of antennas 530 at the second wireless communication device.

The received data streams may be passed to fast Fourier transform (FFT) components 535 to perform a FFT. For instance, at FFT component 535-a through FFT component 535-n, the second wireless communication device may perform a FFT on respective data streams received at antennas 530. In some examples, the second wireless communication device may perform FFTs based on a number of antennas 530.

The second wireless communication device may decouple the received data streams and perform MIMO detection at stream decoupling and MIMO detector 540. For example, the second wireless communication device may partition the received data streams into user groups and perform Givens rotations-based null projection to determine LLRs for modulation symbols of each of the user groups, as described herein. Thus, the second wireless communication device may produce "soft bits" (e.g., in the form of LLRs) using the techniques described herein.

The second wireless communication device may send the LLRs for the data streams associated with different user groups to multiple channel decoders 550 (e.g., channel decoder 550-a through channel decoder 550-n). For example, LLR 545-a and LLR 545-b may be associated with a first user group, and the second wireless communication device may use channel decoder 550-a to determine the information bits for the first user group based on the corresponding LLRs 545-a and 545-b. Similarly, LLR 545-c and LLR 545-d may be associated with a second user group, and the second wireless communication device may use channel decoder 550-n to determine the information bits for the second user group based on the corresponding LLRs 545-c and 545-d. The channel decoders 550 may determine modulation symbols based on the LLRs and demodulate the modulation symbols to obtain the information bits sent by one or more transmitting wireless devices.

Figure 6:
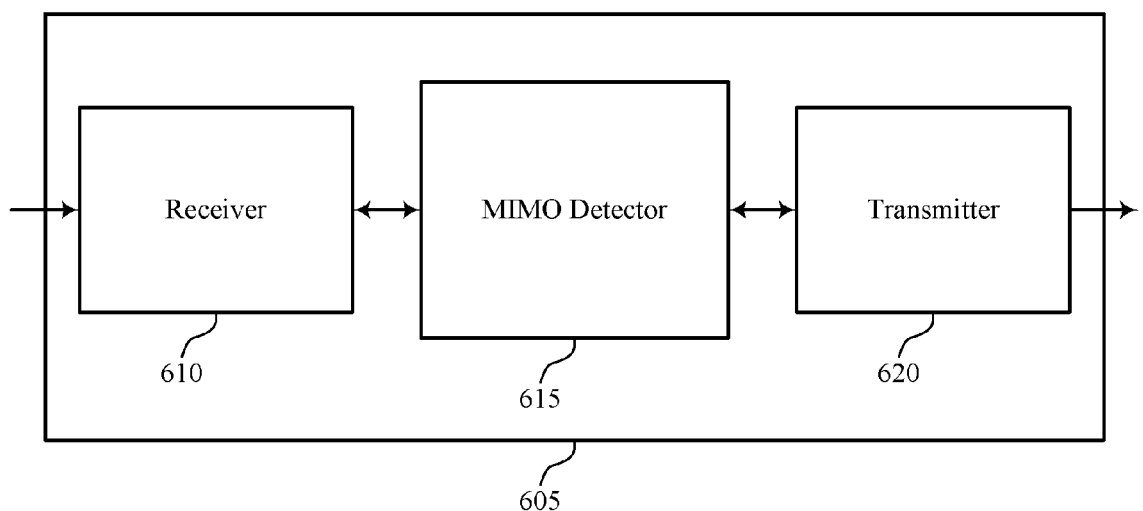
FIGS. 6 through 8 show block diagrams of a device that supports enhanced MIMO detection in accordance with aspects of the present disclosure.

FIG. 6 shows a block diagram 600 of a wireless communication device 605 that supports low-complexity Givens rotations-based null-projection MIMO detection in accordance with various aspects of the present disclosure. Wireless communication device 605 may be an example of aspects of a wireless communication device, an AP 105 or a station 115 for example, as described with reference to FIG.

1. Wireless communication device 605 may include receiver 610, MIMO detector 615, and transmitter 620. Wireless communication device 605 may also include a processor. Each of these components may be in communication with one another (e.g., via one or more buses).

Receiver 610 may receive information such as packets, user data, or control information associated with various information channels (e.g., control channels, data channels, and information related to low-complexity Givens rotations-based null-projection MIMO detection, etc.). Information may be passed on to other components of the device. The receiver 610 may be an example of aspects of the transceiver 935 described with reference to FIG. 9.

MIMO detector 615 may be an example of aspects of the MIMO detector 915 described with reference to FIG. 9. MIMO detector 615 and/or at least some of its various sub-components may be implemented in hardware, software executed by a processor, firmware, or any combination thereof. If implemented in software executed by a processor, the functions of the MIMO detector 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The MIMO detector 615 and/or at least some of its various sub-components may be physically located at various positions, including being distributed such that portions of functions are implemented at different physical locations by one or more physical devices. In some examples, MIMO detector 615 and/or at least some of its various sub-components may be a separate and distinct component in accordance with various aspects of the present disclosure. In other examples, MIMO detector 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

MIMO detector 615 may receive a set of data streams from a second wireless communication device via a communication channel between the first wireless communication device and the second wireless communication device, identify, from a first set of data streams of the set of data streams, a first set of modulation symbols based on a set of characteristics of the communication channel, where the first set of modulation symbols includes first data for the first wireless communication device, identify, from a second set of data streams of the set of data streams, a second set of modulation symbols based on the set of characteristics of the communication channel, where the second set of modulation symbols includes second data for the first wireless communication device, and demodulate the first set of modulation symbols and the second set of modulation symbols to obtain the first data and the second data.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
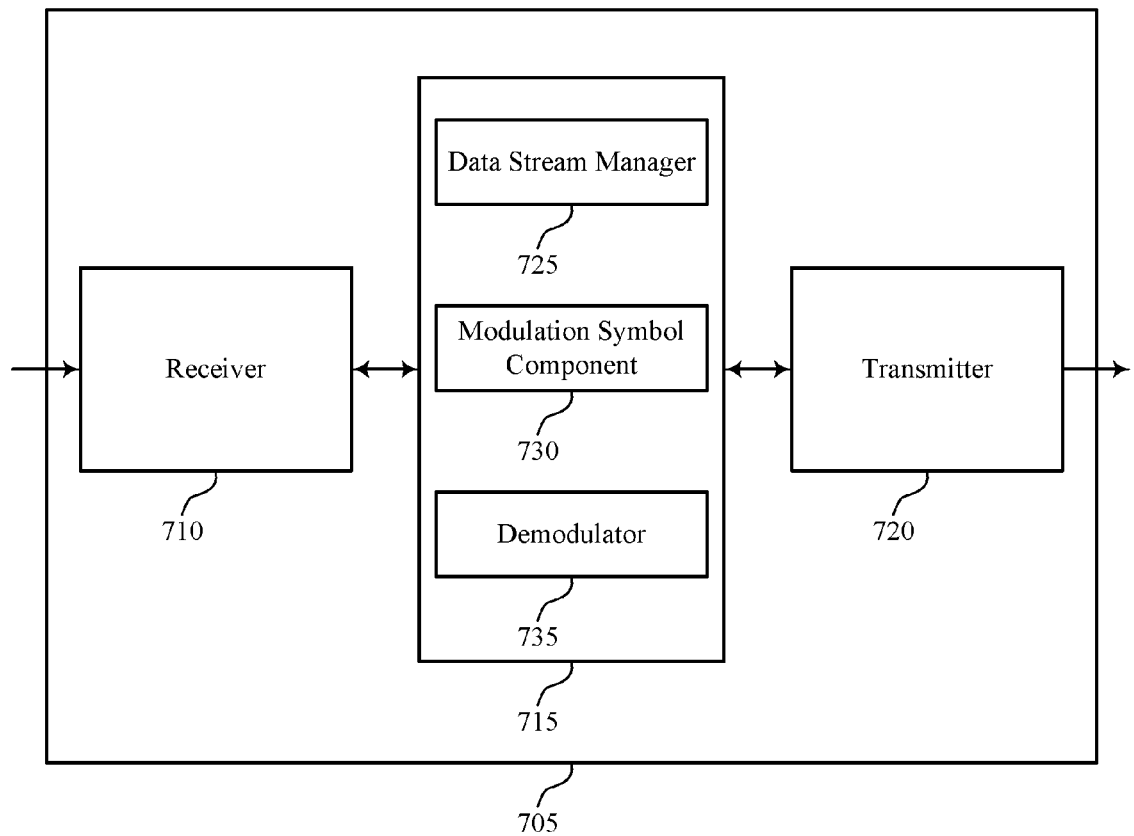

FIG. 7 shows a block diagram 700 of a wireless communication device 705 that supports low-complexity Givens rotations-based null-projection MIMO detection in accordance with various aspects of the present disclosure. Wireless communication device 705 may be an example of aspects of a wireless communication device 605 or a wireless communication device as described with reference to FIGS. 1 and 6. Wireless communication device 705 may include receiver 710, MIMO detector 715, and transmitter 720. Wireless communication device 705 may also include a processor. Each of these components may be in communication with one another (e.g., via one or more buses).

Receiver 710 may receive information such as packets, user data, or control information associated with various information channels (e.g., control channels, data channels, and information related to low-complexity Givens rotations-based null-projection MIMO detection, etc.). Information may be passed on to other components of the device. The receiver 710 may be an example of aspects of the transceiver 935 described with reference to FIG. 9. MIMO detector 715 may be an example of aspects of the MIMO detector 915 described with reference to FIG. 9. MIMO detector 715 may also include data stream manager 725, modulation symbol component 730, and demodulator 735.

Data stream manager 725 may receive a set of data streams from a second wireless communication device via a communication channel between the first wireless communication device and the second wireless communication device. In some cases, the set of data streams includes a spatially multiplexed, MIMO data stream. In some cases, the set of data streams includes an eight-by-one dimensional (8×1) MIMO data stream. In other examples a different number of antennas may be used and the MIMO data stream may have a different dimension. In some cases, the first wireless communication device includes a member of a first user group and the second wireless communication device includes a member of a second user group.

Modulation symbol component 730 may identify, from a first set of data streams of the set of data streams, a first set of modulation symbols based on a set of characteristics of the communication channel, where the first set of modulation symbols includes first data for the first wireless communication device. Additionally, modulation symbol component 730 may identify, from a second set of data streams of the set of data streams, a second set of modulation symbols based on the set of characteristics of the communication channel, where the second set of modulation symbols includes second data for the first wireless communication device. In some cases, modulation symbol component 730 may identify the second set of modulation symbols from the set of data streams based on application of the first sequence, identify the second set of modulation symbols based on a comparison of the first subset of values and the second subset of values, identify the first set of modulation symbols from the set of data streams based on application of the second sequence, and identify the first set of modulation symbols based on a comparison of the third subset of values and the fourth subset of values. In some cases, identifying the second set of modulation symbols based on the set of characteristics of the communication channel includes: determining, based on a first characteristic of the communication channel, a first sequence associated with the first set of modulation symbols. In some cases, identifying the first set of modulation symbols based on the set of characteristics of the communication channel includes: determining, based on the second characteristic of the communication channel, a second sequence associated with the second set of modulation symbols.

Demodulator 735 may demodulate the first set of modulation symbols and the second set of modulation symbols to obtain the first data and the second data. Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
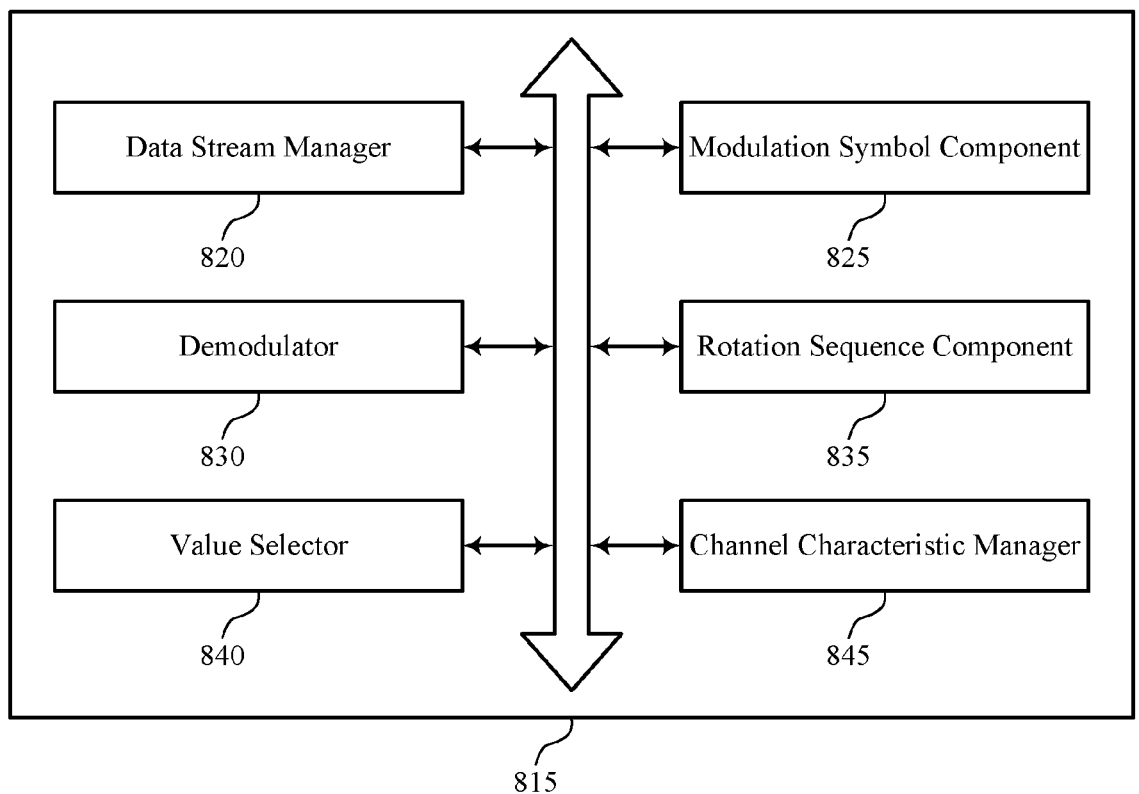

FIG. 8 shows a block diagram 800 of a MIMO detector 815 that supports low-complexity Givens rotations-based null-projection MIMO detection in accordance with various aspects of the present disclosure. The MIMO detector 815 may be an example of aspects of a MIMO detector 615, a MIMO detector 715, or a MIMO detector 915 described with reference to FIGS. 6, 7, and 9. The MIMO detector 815 may include data stream manager 820, modulation symbol component 825, demodulator 830, rotation sequence component 835, value selector 840, and channel characteristic manager 845. Each of these modules may communicate, directly or indirectly, with one another (e.g., via one or more buses).

Data stream manager 820 may receive a set of data streams from a second wireless communication device via a communication channel between the first wireless communication device and the second wireless communication device. In some cases, the set of data streams includes a spatially multiplexed, MIMO data stream. In some cases, the first wireless communication device includes a member of a first user group and the second wireless communication device includes a member of a second user group.

Modulation symbol component 825 may identify, from a first set of data streams of the set of data streams, a first set of modulation symbols based on a set of characteristics of the communication channel, where the first set of modulation symbols includes first data for the first wireless communication device, identify, from a second set of data streams of the set of data streams, a second set of modulation symbols based on the set of characteristics of the communication channel, where the second set of modulation symbols includes second data for the first wireless communication device, identify the second set of modulation symbols from the set of data streams based on application of the first sequence, identify the second set of modulation symbols based on a comparison of the first subset of values and the second subset of values, identify the first set of modulation symbols from the set of data streams based on application of the second sequence, and identify the first set of modulation symbols based on a comparison of the third subset of values and the fourth subset of values. In some cases, identifying the second set of modulation symbols based on the set of characteristics of the communication channel includes: determining, based on a first characteristic of the communication channel, a first sequence associated with the first set of modulation symbols. In some cases, identifying the first set of modulation symbols based on the set of characteristics of the communication channel includes: determining, based on the second characteristic of the communication channel, a second sequence associated with the second set of modulation symbols.

Demodulator 830 may demodulate the first set of modulation symbols and the second set of modulation symbols to obtain the first data and the second data. Rotation sequence component 835 may apply the first sequence to the set of data streams and a set of values that are based on a second characteristic of the communication channel, and apply the second sequence to the set of data streams and a set of values that are based on the first characteristic of the communication channel. In some cases, the first sequence is determined based on a first QR decomposition and the second sequence is determined based on a second QR decomposition.

Value selector 840 may select a first subset of values and a second subset of values from the set of data streams after application of the first sequence, and select a third subset of values and a fourth subset of values from the set of data streams after application of the second sequence. Channel characteristic manager 845 may receive a set of pilot signals from the second wireless communication device, and determine the set of characteristics of the communication channel based on the set of pilot signals.

Figure 9:
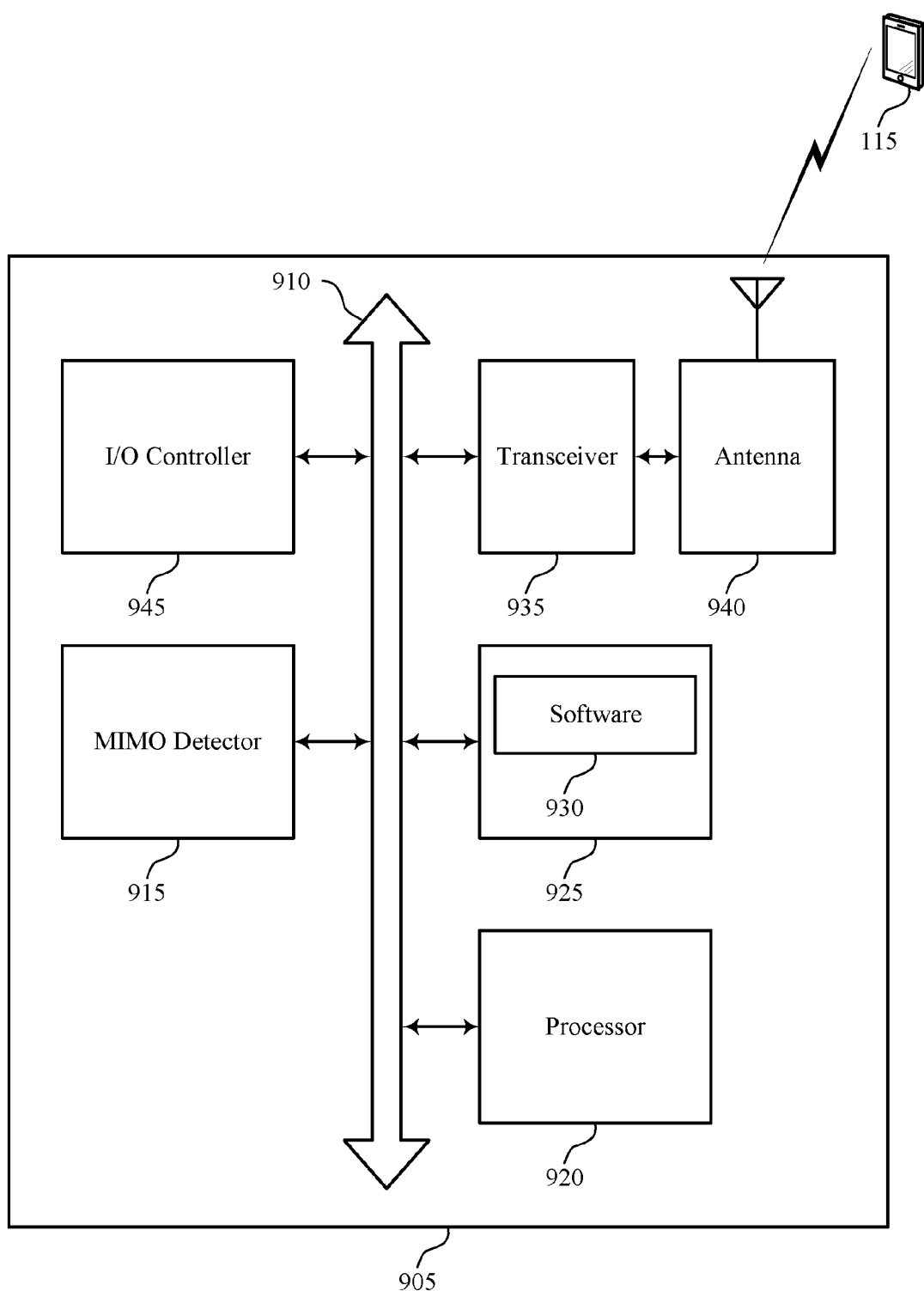
FIG. 9 illustrates a block diagram of a system, including a wireless communication device, that supports enhanced MIMO detection in accordance with aspects of the present disclosure.

FIG. 9 shows a diagram of a system 900 including a device 905 that supports low-complexity Givens rotations-based null-projection MIMO detection in accordance with various aspects of the present disclosure. Device 905 may be an example of or include the components of wireless communication device 605, wireless communication device 705, or a wireless communication device as described above, e.g., with reference to FIGS. 1, 6 and 7. Device 905 may include components for bi-directional voice and data communications including components for transmitting and receiving communications, including MIMO detector 915, processor 920, memory 925, software 930, transceiver 935, antenna 940, and I/O controller 945. These components may be in electronic communication via one or more busses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting low-complexity Givens rotations-based null-projection MIMO detection).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support low-complexity Givens rotations-based null-projection MIMO detection. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless communication device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
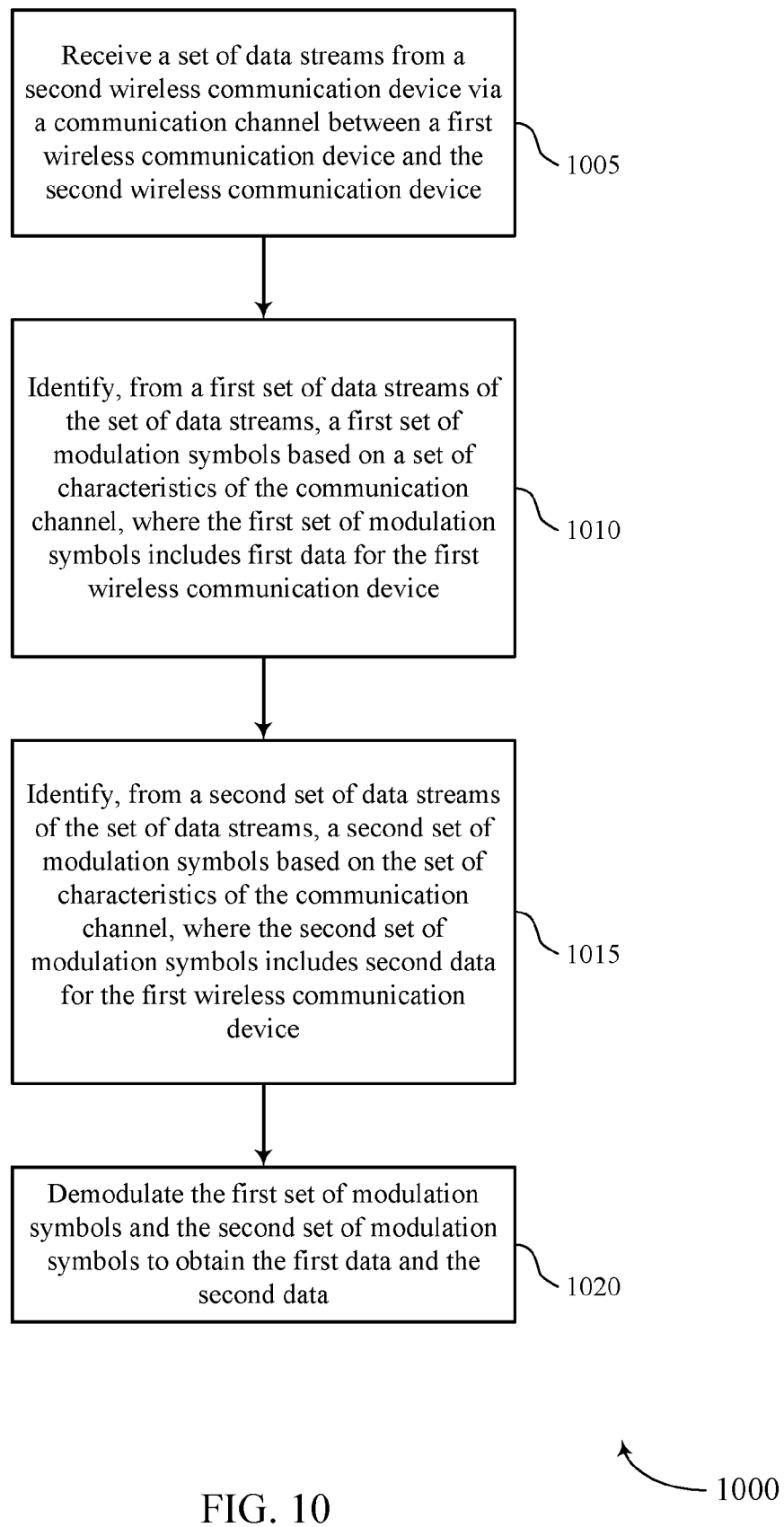
FIGS. 10 through 12 illustrate methods for enhanced MIMO detection in accordance with aspects of the present disclosure.

FIG. 10 shows a flowchart illustrating a method 1000 for low-complexity Givens rotations-based null-projection MIMO detection in accordance with various aspects of the present disclosure. The operations of method 1000 may be implemented by a wireless communication device, an AP 105 or a station 115 for example, or its components as described herein. For example, the operations of method 1000 may be performed by a MIMO detector as described with reference to FIGS. 6 through 9. In some examples, a wireless communication device may execute a set of codes to control the functional elements of the device to perform the functions described below. Additionally or alternatively, the wireless communication device may perform aspects of the functions described below using special-purpose hardware.

At block 1005 the wireless communication device may receive a set of data streams from a second wireless communication device via a communication channel between the first wireless communication device and the second wireless communication device. The operations of block 1005 may be performed according to the methods described with reference to FIGS. 1 through 4. In certain examples, aspects of the operations of block 1005 may be performed by a data stream manager as described with reference to FIGS. 6 through 9.

At block 1010 the wireless communication device may identify, from a first set of data streams of the set of data streams, a first set of modulation symbols based at least in part on a set of characteristics of the communication channel, where the first set of modulation symbols includes first data for the first wireless communication device. The operations of block 1010 may be performed according to the methods described with reference to FIGS. 1 through 4. In certain examples, aspects of the operations of block 1010 may be performed by a modulation symbol component as described with reference to FIGS. 6 through 9.

At block 1015 the wireless communication device may identify, from a second set of data streams of the set of data streams, a second set of modulation symbols based at least in part on the set of characteristics of the communication channel, where the second set of modulation symbols includes second data for the first wireless communication device. The operations of block 1015 may be performed according to the methods described with reference to FIGS. 1 through 4. In certain examples, aspects of the operations of block 1015 may be performed by a modulation symbol component as described with reference to FIGS. 6 through 9.

At block 1020 the wireless communication device may demodulate the first set of modulation symbols and the second set of modulation symbols to obtain the first data and the second data. The operations of block 1020 may be performed according to the methods described with reference to FIGS. 1 through 4. In certain examples, aspects of the operations of block 1020 may be performed by a demodulator as described with reference to FIGS. 6 through 9.

Figure 11:
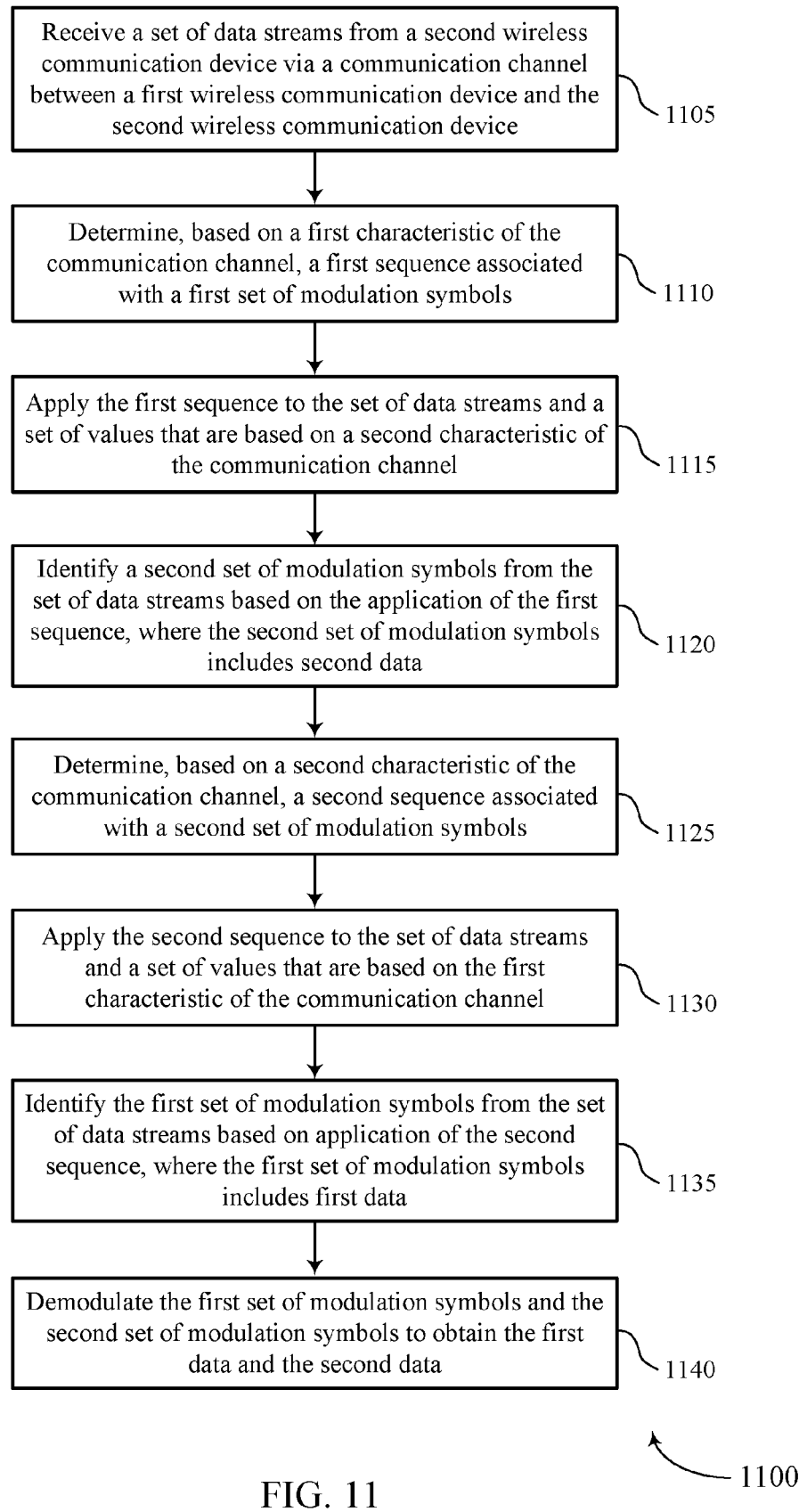

FIG. 11 shows a flowchart illustrating a method 1100 for low-complexity Givens rotations-based null-projection MIMO detection in accordance with various aspects of the present disclosure. The operations of method 1100 may be implemented by a wireless communication device, such as an AP 105 or a station 115, or its components as described herein. For example, the operations of method 1100 may be performed by a MIMO detector as described with reference to FIGS. 6 through 9. In some examples, a wireless communication device may execute a set of codes to control the functional elements of the device to perform the functions described below. Additionally or alternatively, the wireless communication device may perform aspects of the functions described below using special-purpose hardware.

At block 1105 the wireless communication device may receive a set of data streams from a second wireless communication device via a communication channel between the wireless communication device and the second wireless communication device. The operations of block 1105 may be performed according to the methods described with reference to FIGS. 1 through 4. In certain examples, aspects of the operations of block 1105 may be performed by a data stream manager as described with reference to FIGS. 6 through 9.

At block 1110 the wireless communication device may determine, based on a first characteristic of the communication channel, a first sequence associated with a first set of modulation symbols. The operations of block 1110 may be performed according to the methods described with reference to FIGS. 1 through 4. In certain examples, aspects of the operations of block 1110 may be performed by a modulation symbol component as described with reference to FIGS. 6 through 9.

At block 1115 the wireless communication device may apply the first sequence to the set of data streams and a set of values that are based at least in part on a second characteristic of the communication channel. The operations of block 1115 may be performed according to the methods described with reference to FIGS. 1 through 4. In certain examples, aspects of the operations of block 1115 may be performed by a rotation sequence component as described with reference to FIGS. 6 through 9.

At block 1120 the wireless communication device may identify a second set of modulation symbols from the set of data streams based on the application of the first sequence, where the second set of modulation symbols includes second data. The operations of block 1120 may be performed according to the methods described with reference to FIGS. 1 through 4. In certain examples, aspects of the operations of block 1120 may be performed by a modulation symbol component as described with reference to FIGS. 6 through 9.

At block 1125 the wireless communication device may determine, based on a second characteristic of the communication channel, a second sequence associated with a second set of modulation symbols. The operations of block 1125 may be performed according to the methods described with reference to FIGS. 1 through 4. In certain examples, aspects of the operations of block 1125 may be performed by a modulation symbol component as described with reference to FIGS. 6 through 9.

At block 1130 the wireless communication device may apply the second sequence to the set of data streams and a set of values that are based on the first characteristic of the communication channel. The operations of block 1130 may be performed according to the methods described with reference to FIGS. 1 through 4. In certain examples, aspects of the operations of block 1130 may be performed by a rotation sequence component as described with reference to FIGS. 6 through 9.

At block 1135 the wireless communication device may identify the second set of modulation symbols from the set of data streams based on the application of the first sequence, where the first set of modulation symbols includes first data. The operations of block 1135 may be performed according to the methods described with reference to FIGS. 1 through 4. In certain examples, aspects of the operations of block 1135 may be performed by a modulation symbol component as described with reference to FIGS. 6 through 9.

At block 1140 the wireless communication device may demodulate the first set of modulation symbols and the second set of modulation symbols to obtain the first data and the second data. The operations of block 1140 may be performed according to the methods described with reference to FIGS. 1 through 4. In certain examples, aspects of the operations of block 1140 may be performed by a demodulator as described with reference to FIGS. 6 through 9.

Figure 12:
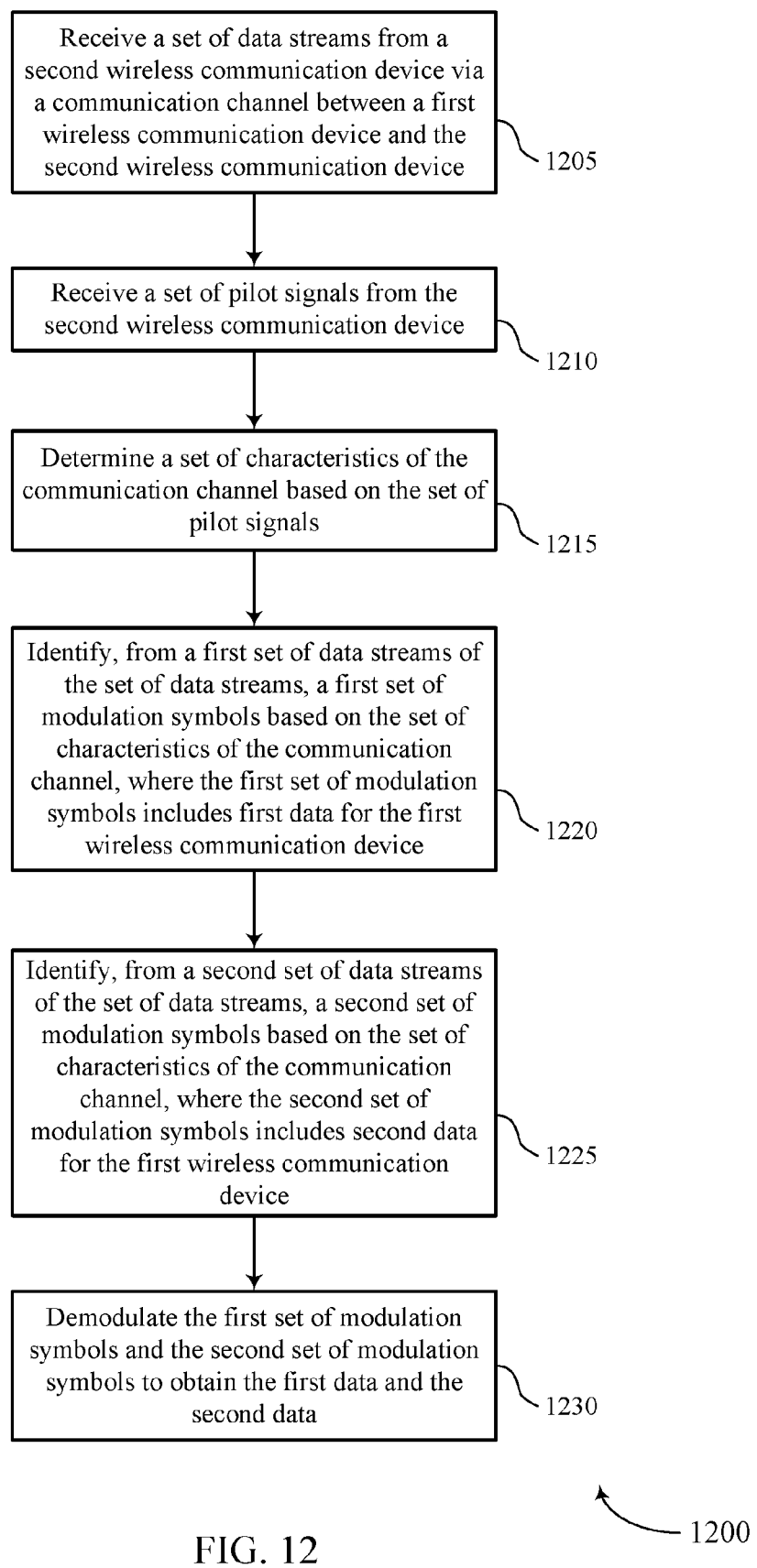

FIG. 12 shows a flowchart illustrating a method 1200 for low-complexity Givens rotations-based null-projection MIMO detection in accordance with various aspects of the present disclosure. The operations of method 1200 may be implemented by a wireless communication device (e.g., an AP or a station 115) or its components as described herein. For example, the operations of method 1200 may be performed by a MIMO detector as described with reference to FIGS. 6 through 9. In some examples, a wireless communication device may execute a set of codes to control the functional elements of the device to perform the functions described below. Additionally or alternatively, the wireless communication device may perform aspects of the functions described below using special-purpose hardware.

At block 1205 the wireless communication device may receive a set of data streams from a second wireless communication device via a communication channel between the wireless communication device and the second wireless communication device. The operations of block 1205 may be performed according to the methods described with reference to FIGS. 1 through 4. In certain examples, aspects of the operations of block 1205 may be performed by a data stream manager as described with reference to FIGS. 6 through 9.

At block 1210 the wireless communication device may receive a set of pilot signals from the second wireless communication device. The operations of block 1210 may be performed according to the methods described with reference to FIGS. 1 through 4. In certain examples, aspects of the operations of block 1210 may be performed by a channel characteristic manager as described with reference to FIGS. 6 through 9.

At block 1215 the wireless communication device may determine the set of characteristics of the communication channel based at least in part on the set of pilot signals. The operations of block 1215 may be performed according to the methods described with reference to FIGS. 1 through 4. In certain examples, aspects of the operations of block 1215 may be performed by a channel characteristic manager as described with reference to FIGS. 6 through 9.

At block 1220 the wireless communication device may identify, from a first set of data streams of the set of data streams, a first set of modulation symbols based at least in part on a set of characteristics of the communication channel, where the first set of modulation symbols includes first data for the first wireless communication device. The operations of block 1220 may be performed according to the methods described with reference to FIGS. 1 through 4. In certain examples, aspects of the operations of block 1220 may be performed by a modulation symbol component as described with reference to FIGS. 6 through 9.

At block 1225 the wireless communication device may identify, from a second set of data streams of the set of data streams, a second set of modulation symbols based at least in part on the set of characteristics of the communication channel, where the second set of modulation symbols includes second data for the first wireless communication device. The operations of block 1225 may be performed according to the methods described with reference to FIGS. 1 through 4. In certain examples, aspects of the operations of block 1225 may be performed by a modulation symbol component as described with reference to FIGS. 6 through 9.

At block 1230 the wireless communication device may demodulate the first set of modulation symbols and the second set of modulation symbols to obtain the first data and the second data. The operations of block 1230 may be performed according to the methods described with reference to FIGS. 1 through 4. In certain examples, aspects of the operations of block 1230 may be performed by a demodulator as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and wireless communications system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless communication device, comprising:

receiving a plurality of data streams from a second wireless communication device via a communication channel between the first wireless communication device and the second wireless communication device;

identifying, from a first set of data streams of the plurality of data streams, a first set of modulation symbols based at least in part on a plurality of characteristics of the communication channel, wherein the first set of modulation symbols comprises first data for the first wireless communication device;

identifying, from a second set of data streams of the plurality of data streams, a second set of modulation symbols based at least in part on the plurality of characteristics of the communication channel, wherein the second set of modulation symbols comprises second data for the first wireless communication device; and demodulating the first set of modulation symbols and the second set of modulation symbols to obtain the first data and the second data.

2. The method of claim 1, wherein identifying the second set of modulation symbols based at least in part on the plurality of characteristics of the communication channel comprises:

determining, based at least in part on a first characteristic of the communication channel, a first sequence associated with the first set of modulation symbols;

applying the first sequence to the plurality of data streams and a set of values that are based at least in part on a second characteristic of the communication channel; and identifying the second set of modulation symbols from the plurality of data streams based at least in part on application of the first sequence.

3. The method of claim 2, further comprising:

selecting a first subset of values and a second subset of values from the plurality of data streams after application of the first sequence; and identifying the second set of modulation symbols based at least in part on a comparison of the first subset of values and the second subset of values.

4. The method of claim 2, wherein identifying the first set of modulation symbols based at least in part on the plurality of characteristics of the communication channel comprises:

determining, based at least in part on the second characteristic of the communication channel, a second sequence associated with the second set of modulation symbols;

applying the second sequence to the plurality of data streams and a set of values that are based at least in part on the first characteristic of the communication channel; and identifying the first set of modulation symbols from the plurality of data streams based at least in part on application of the second sequence.

5. The method of claim 4, further comprising:

selecting a third subset of values and a fourth subset of values from the plurality of data streams after application of the second sequence; and identifying the first set of modulation symbols based at least in part on a comparison of the third subset of values and the fourth subset of values.

6. The method of claim 4, wherein the first sequence is determined based at least in part on a first QR decomposition and the second sequence is determined based at least in part on a second QR decomposition.

7. The method of claim 1, wherein the plurality of data streams comprises a spatially multiplexed, multiple input, multiple output (MIMO) data stream.

8. The method of claim 7, wherein the plurality of data streams comprises an eight-by-one dimensional (8×1) MIMO data stream.

9. The method of claim 1, wherein the first wireless communication device comprises a member of a first user group and the second wireless communication device comprises a member of a second user group.

10. The method of claim 1, further comprising:

receiving a plurality of pilot signals from the second wireless communication device; and determining the plurality of characteristics of the communication channel based at least in part on the plurality of pilot signals.

11. An apparatus for wireless communication, comprising:

means for receiving a plurality of data streams from a second wireless communication device via a communication channel between the first wireless communication device and the second wireless communication device;

means for identifying, from a first set of data streams of the plurality of data streams, a first set of modulation symbols based at least in part on a plurality of characteristics of the communication channel, wherein the first set of modulation symbols comprises first data for the first wireless communication device;

means for identifying, from a second set of data streams of the plurality of data streams, a second set of modulation symbols based at least in part on the plurality of characteristics of the communication channel, wherein the second set of modulation symbols comprises second data for the first wireless communication device; and means for demodulating the first set of modulation symbols and the second set of modulation symbols to obtain the first data and the second data.

12. A first wireless communication device, comprising:

a processor;

memory in electronic communication with the processor; and instructions stored in the memory and operable, when executed by the processor, to cause the first wireless communication device to:

receive a plurality of data streams from a second wireless communication device via a communication channel between a first wireless communication device and the second wireless communication device;

identify, from a first set of data streams of the plurality of data streams, a first set of modulation symbols based at least in part on a plurality of characteristics of the communication channel, wherein the first set of modulation symbols comprises first data for the first wireless communication device;

identify, from a second set of data streams of the plurality of data streams, a second set of modulation symbols based at least in part on the plurality of characteristics of the communication channel, wherein the second set of modulation symbols comprises second data for the first wireless communication device; and demodulate the first set of modulation symbols and the second set of modulation symbols to obtain the first data and the second data.

13. The first wireless communication device of claim 12, wherein the instructions are executable by the processor to cause the first wireless communication device to:
- determine, based at least in part on a first characteristic of the communication channel, a first sequence associated with the first set of modulation symbols;
- apply the first sequence to the plurality of data streams and a set of values that are based at least in part on a second characteristic of the communication channel; and
- identify the second set of modulation symbols from the plurality of data streams based at least in part on application of the first sequence.

14. The first wireless communication device of claim 13, wherein the instructions are executable by the processor to cause the first wireless communication device to:
- select a first subset of values and a second subset of values from the plurality of data streams after application of the first sequence; and
- identify the second set of modulation symbols based at least in part on a comparison of the first subset of values and the second subset of values.

15. The first wireless communication device of claim 13, wherein the instructions are executable by the processor to cause the first wireless communication device to:
- determine, based at least in part on the second characteristic of the communication channel, a second sequence associated with the second set of modulation symbols;
- apply the second sequence to the plurality of data streams and a set of values that are based at least in part on the first characteristic of the communication channel; and
- identify the first set of modulation symbols from the plurality of data streams based at least in part on application of the second sequence.

16. The first wireless communication device of claim 15, wherein the instructions are executable by the processor to cause the first wireless communication device to:
- select a third subset of values and a fourth subset of values from the plurality of data streams after application of the second sequence; and
- identify the first set of modulation symbols based at least in part on a comparison of the third subset of values and the fourth subset of values.

17. The first wireless communication device of claim 15, wherein the instructions are executable by the processor to cause the first wireless communication device to:
- determine the first sequence based at least in part on a first QR decomposition; and
- determine the second sequence based at least in part on a second QR decomposition.

18. The first wireless communication device of claim 12, wherein the plurality of data streams comprises a spatially multiplexed, multiple input, multiple output (MIMO) data stream.

19. The first wireless communication device of claim 12, wherein the first wireless communication device comprises a member of a first user group and the second wireless communication device comprises a member of a second user group.

20. The first wireless communication device of claim 12, wherein the instructions are executable by the processor to cause the first wireless communication device to:
- receive a plurality of pilot signals from the second wireless communication device; and
- determine the plurality of characteristics of the communication channel based at least in part on the plurality of pilot signals.

\* \* \* \* \*